US006014123A

United States Patent [19]
Jung

[11] Patent Number: 6,014,123
[45] Date of Patent: Jan. 11, 2000

[54] GRAPHIC SYSTEM FOR DISPLAYING PIXEL DATA ON A DISPLAY UNIT

[75] Inventor: Tae-bo Jung, Yongin, Rep. of Korea

[73] Assignee: Samsung Electronics Co., Ltd., Kyungki-do, Rep. of Korea

[21] Appl. No.: 08/713,225

[22] Filed: Sep. 12, 1996

[30] Foreign Application Priority Data

Dec. 14, 1995 [KR] Rep. of Korea ........................ 95-49696

[51] Int. Cl.[7] ...................................................... G09G 3/00
[52] U.S. Cl. .............................. 345/99; 345/204; 345/508
[58] Field of Search ............................... 345/99, 132, 204, 345/508; 349/149; 340/789; 327/108

[56] References Cited

U.S. PATENT DOCUMENTS

| | | | |
|---|---|---|---|
| 5,270,696 | 12/1993 | Shin et al. ................................ | 340/789 |
| 5,307,085 | 4/1994 | Nakamura .................................. | 345/99 |
| 5,481,275 | 1/1996 | Mical et al. ............................. | 345/132 |
| 5,717,351 | 2/1998 | Katsutani ................................. | 327/108 |
| 5,739,887 | 4/1998 | Ueda et al. ............................. | 349/149 |

*Primary Examiner*—Matthew Luu
*Assistant Examiner*—Jeff Piziali

*Attorney, Agent, or Firm*—Sughrue, Mion, Zinn, Macpeak & Seas, PLLC

[57] ABSTRACT

An extended graphics array (XGA) graphics system is disclosed for converting data received in a double storage bank into a single storage bank when the data is processed. The system includes a graphics data generator for generating synchronizing signals and a main clock signal according to an XGA graphics mode and dividing pixel data to be displayed on a display into even and odd-number data when transmitted from the graphics data generator. It also includes a driving unit having two storage units for storing a predetermined number N of pixel data and for driving the display according to the pixel data stored in the storage units. Connected between the graphics data generator and the driving unit is an interface unit, which includes a plurality of flip-flops, for sequentially arranging the even and odd-number data according to the N pixel data which are to be stored in the storage units, in which the data is arranged based on control signals which are generated by dividing the frequency of the main clock by two and then outputting the sequentially arranged N pixel data to the two storage units, thereby interfacing the graphics data generator with the driving unit. The control signals include carry signals generated by the graphics data generator, the use of which reduces electromagnetic interference (EMI) by employing a lower frequency than the main clock. Further, the number of flip-flops required is fewer than is conventionally used when a shift-register is employed.

24 Claims, 14 Drawing Sheets

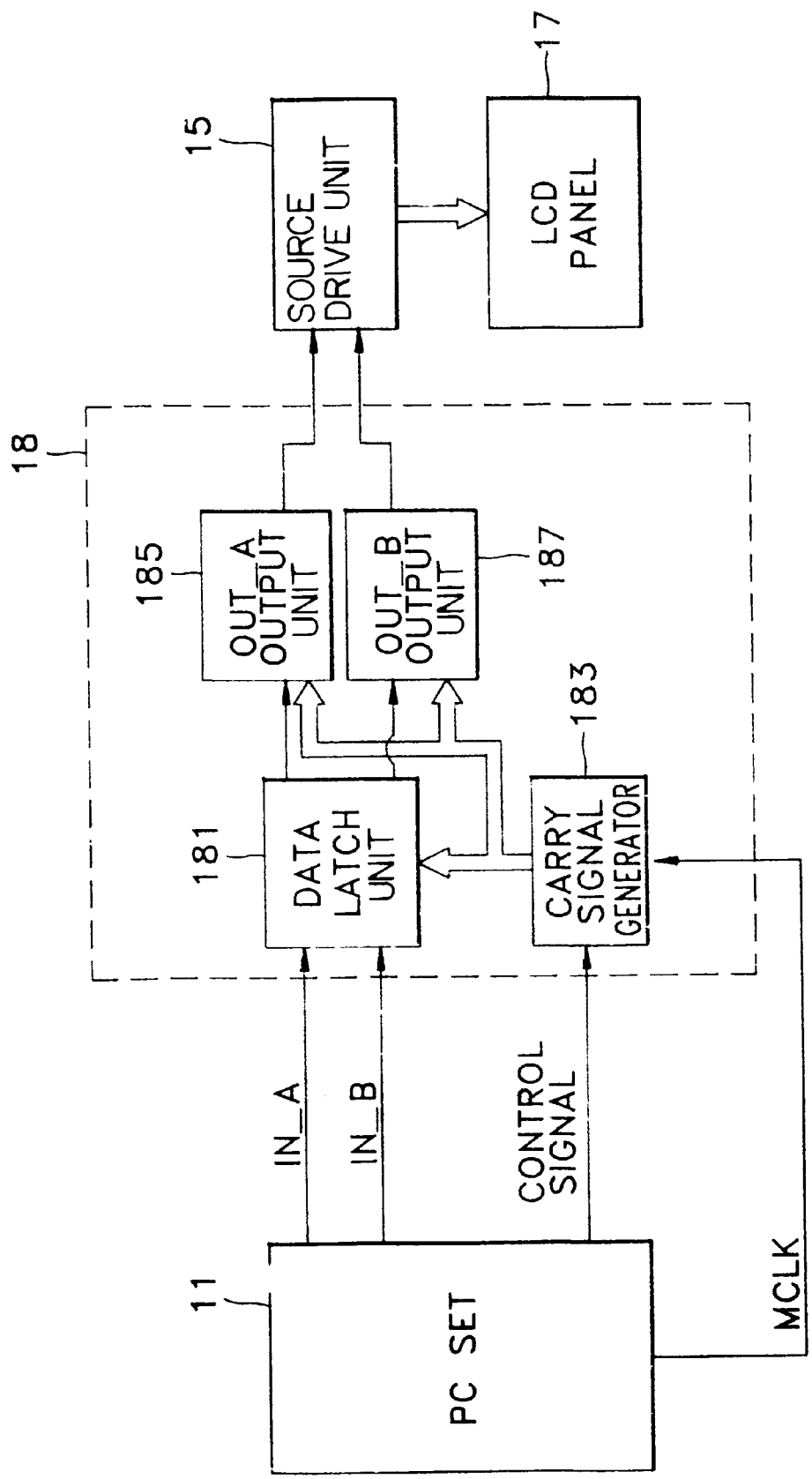

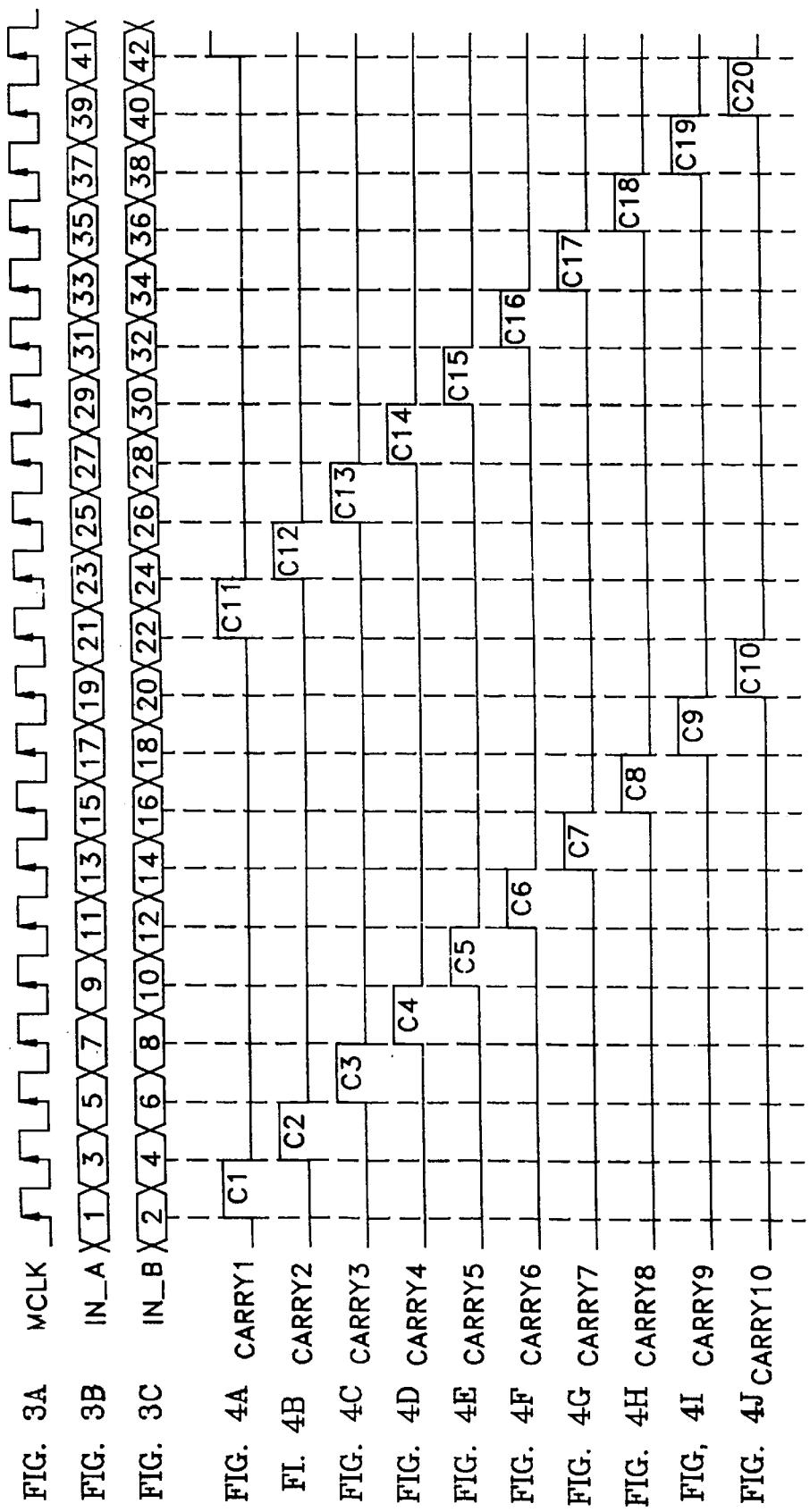

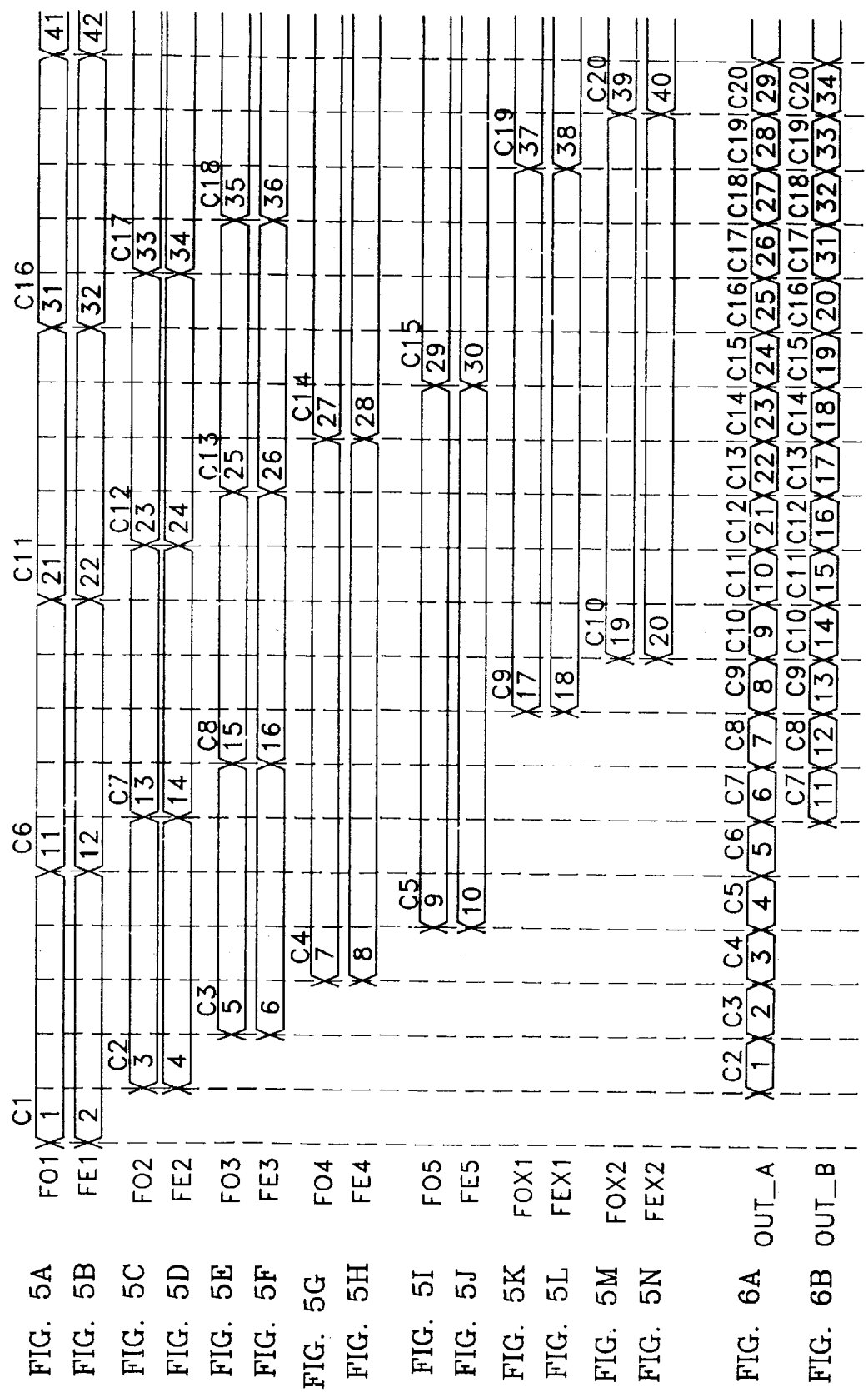

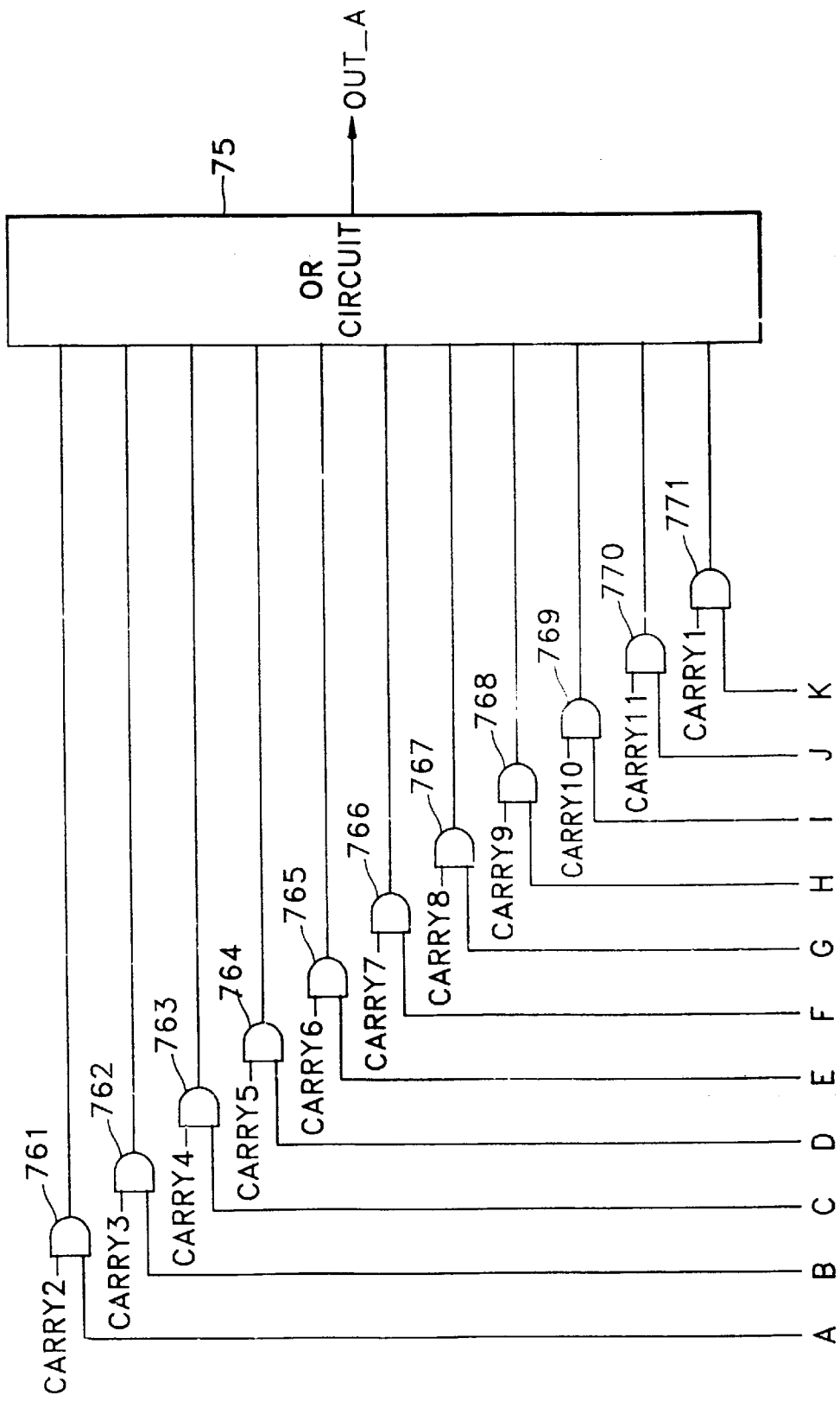

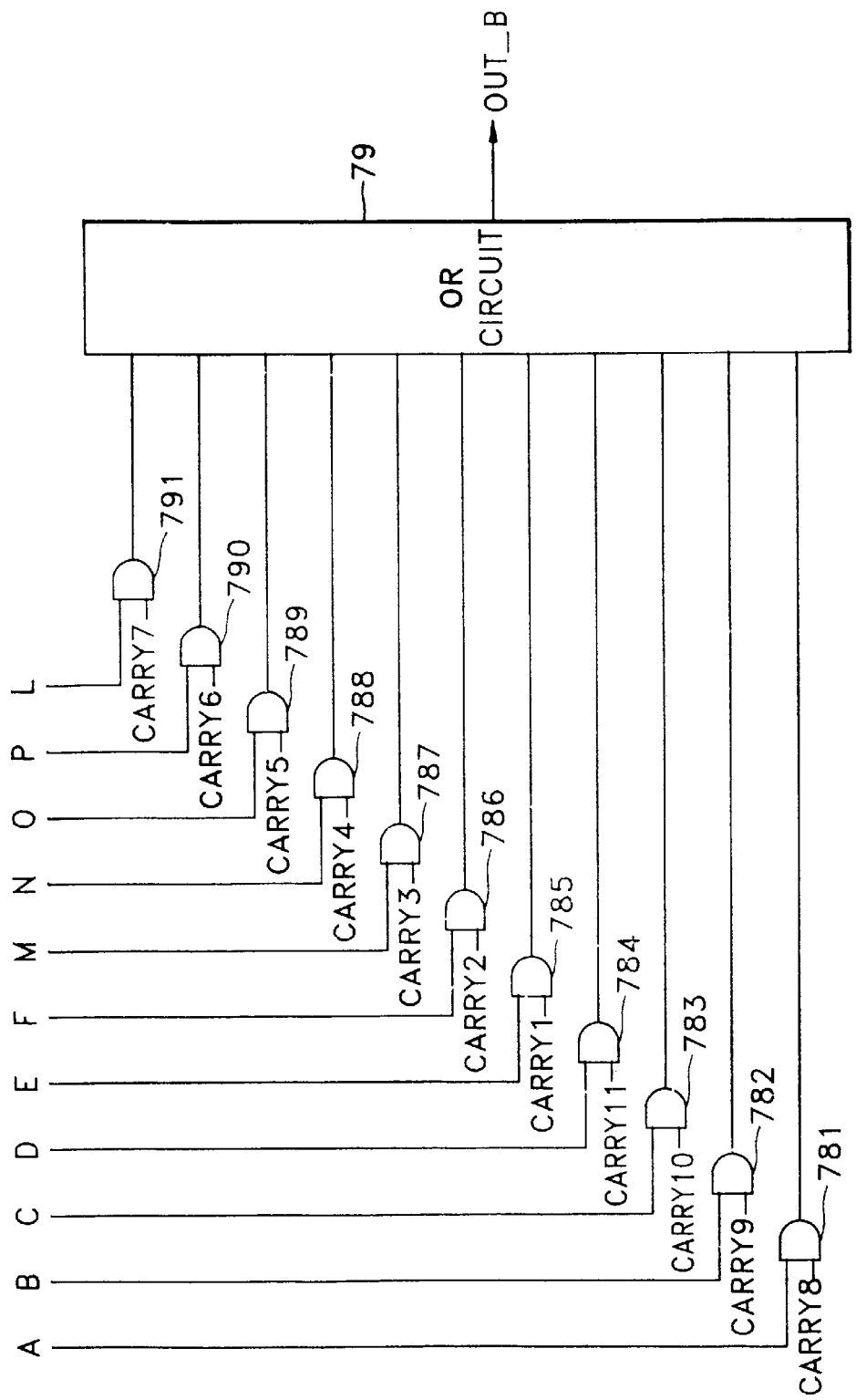

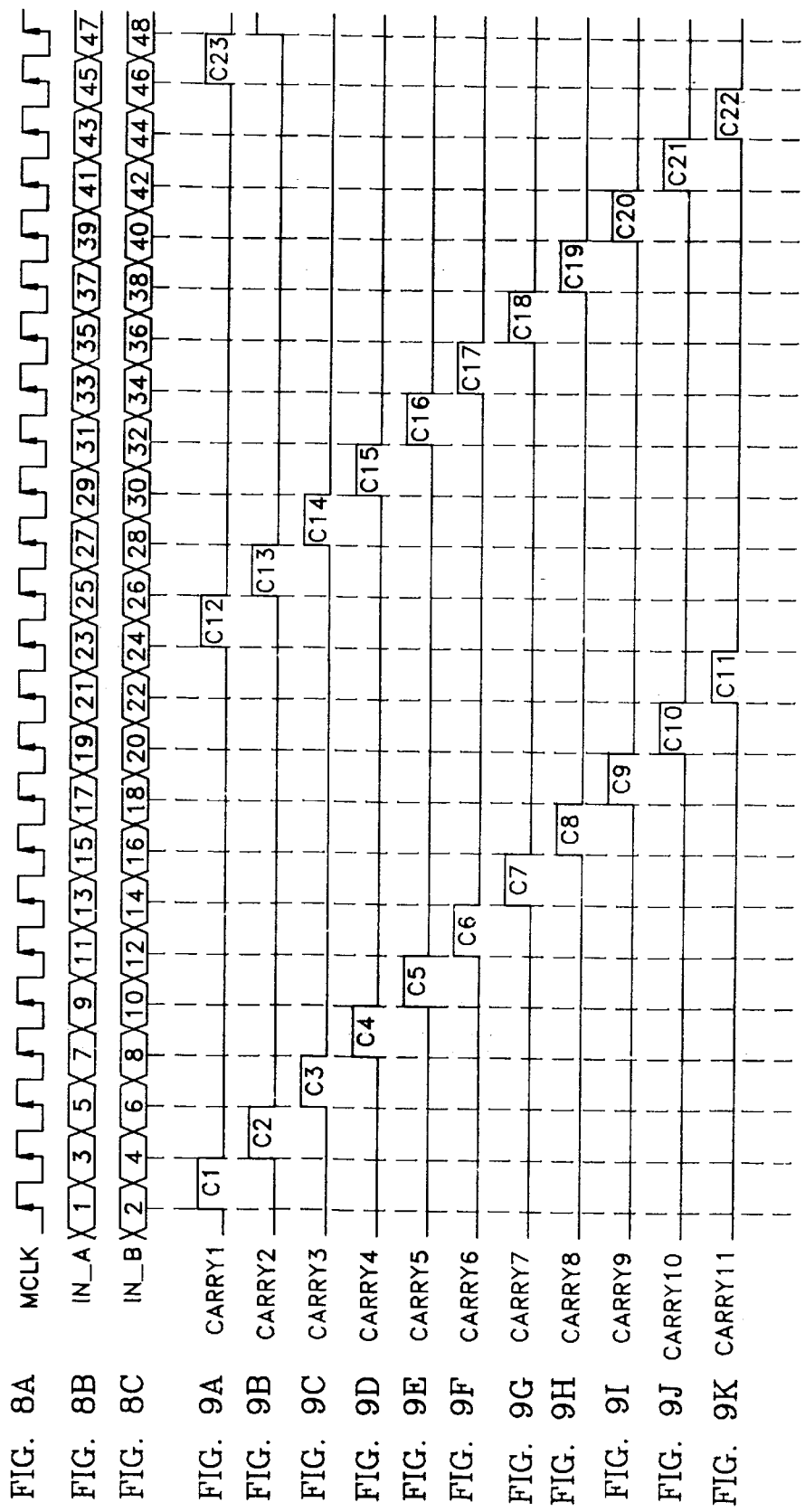

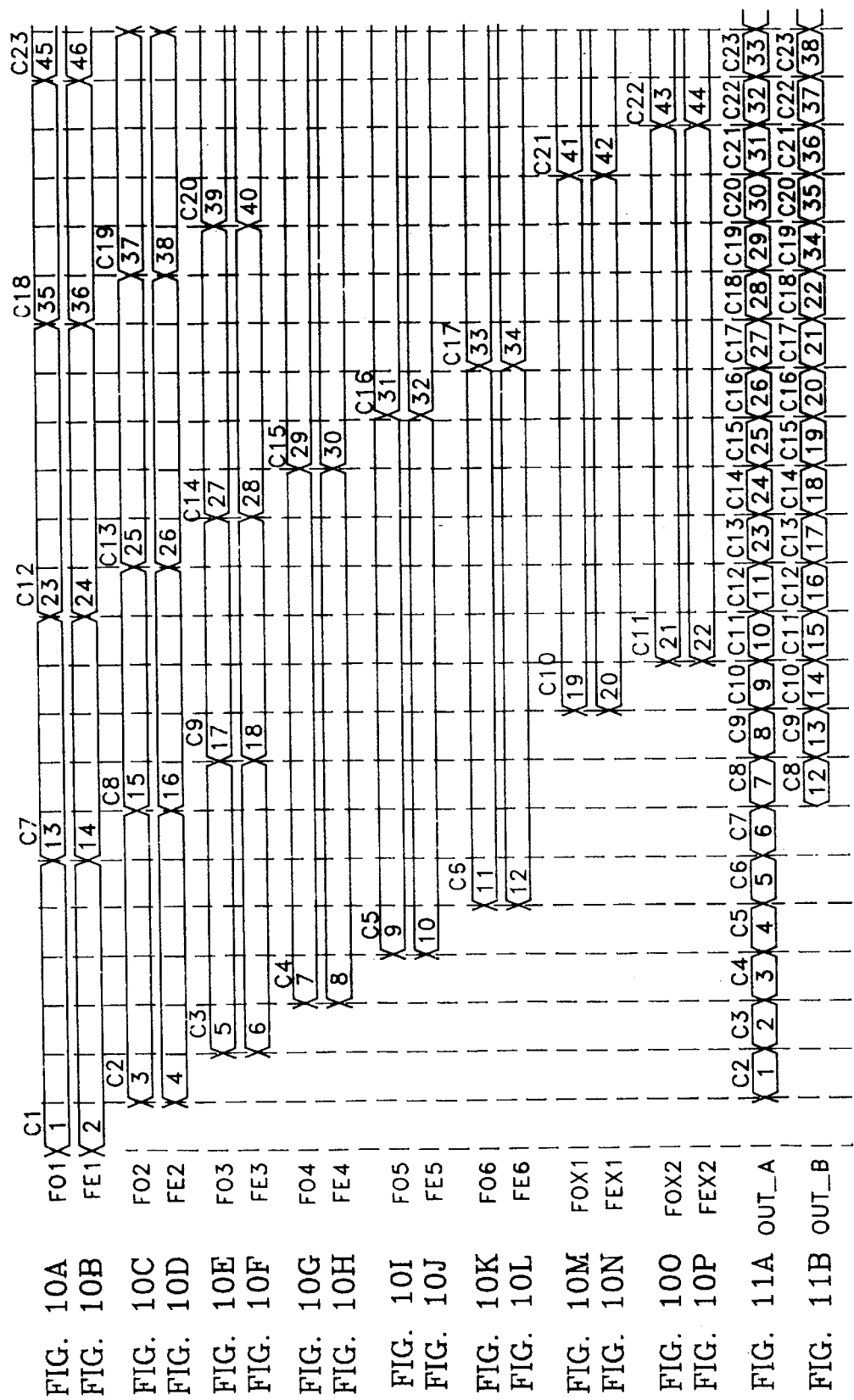

FIG. 12A MCLK

FIG. 12D OUT_A

FIG. 12E OUT_B

GRAPHIC SYSTEM FOR DISPLAYING PIXEL DATA ON A DISPLAY UNIT

BACKGROUND OF THE INVENTION

1. Field of the Invention

The present invention relates to an extended graphics array (XGA) graphics system, and more particularly, to an XGA graphics system in which data received into a double memory bank is converted into a single memory bank.

2. Description of the Related Art

FIG. 13 is a block diagram showing a structure of a conventional graphics system. A PC-SET 131 is a computer having an XGA graphics card which generates control signals and a data signal, which are for an XGA graphics mode. Here, the control signals are a vertical synchronizing signal (Vsync), a horizontal synchronizing signal (Hsync), a data enable signal (DE), and a main clock (MCLK). The data signal, which includes pixel data to be displayed on a screen, is divided into even-number data (IN_B) and odd-number data (IN_A) when transmitted.

An interface unit (I/F IC) 133 controls three drive units, e.g., a gate drive unit (GATE IC) 137, an up-source drive unit (UP-SOURCE IC) 138, and a down-source drive unit (DOWN-SOURCE IC) 139 according to the control signals and the data signal transmitted from PC-SET 131. Interface unit (I/F IC) 133 transmits IN_B to up-source drive unit (UP-SOURCE IC) 138 and IN_A to down-source drive unit (DOWN-SOURCE IC) 139. An LCD panel 135 is driven by gate drive unit (GATE IC) 137, up-source drive unit (UP-SOURCE IC) 138, and down-source drive unit (DOWN-SOURCE IC) 139.

FIG. 14 is a view for illustrating operation of the conventional interface unit (I/F IC) 133 of FIG. 13. The even-number data IN_B is sequentially transmitted to source drive unit (UP-SOURCE IC) 138 through flip-flops 141, and the odd-number data IN_A is sequentially transmitted to the down-source drive unit (DOWN-SOURCE IC) 139 through flip-flops 142. Here, the data transmission is synchronized by main clock MCLK. LCD panel 135 is driven by up-source drive unit (UP-SOURCE IC) 138 and down-source drive unit (DOWN-SOURCE IC) 139.

Accordingly, the conventional graphics system is appropriate for a circuit which sequentially outputs sequentially received data, but inappropriate for a circuit which temporarily stores the data or outputs the data regardless of order. Also, since the data is processed by main clock MCLK which has a high frequency, the probability of electromagnetic interference is high. Moreover, a great deal of power is consumed due to the many state transitions of main clock MCLK.

SUMMARY OF THE INVENTION

Accordingly, it is an object of the present invention to provide an extended graphics array (XGA) graphics system for dividing pixel data into odd-number and even-number data when transmitted, sequentially arranging the data, and then processing the arranged data.

It is another object of the invention to reduce the electromagnetic interference (EMI) produced.

It is yet another object of the invention to reduce the number of flip-flops required for an extended graphics array (XGA) graphics system.

Further still, it is an object of the invention to reduce the total required power consumption.

To accomplish the above objects, there is provided an extended graphics array (XGA) graphics system for displaying pixel data on a display unit in an XGA graphics mode, comprising:

graphics data generating means for generating synchronizing signals and a main clock signal according to the XGA graphics mode and dividing pixel data to be displayed on said display unit into first and second data groups, and outputting the first and second data groups;

driving means having two storing means for storing a predetermined number N of the pixel data and for driving said display unit according to said pixel data stored in said storing means; and interfacing means for sequentially arranging the pixel data of said first and second groups output from said graphics data generating means into groups of N pixel data according to control signals obtained by dividing the frequency of said main clock in two and then outputting the groups of sequentially arranged N pixel data to said two storing means of said driving means, thereby interfacing said graphics data generating means with said driving means.

BRIEF DESCRIPTION OF THE DRAWINGS

The above object and advantages of the present invention will become more apparent by describing in detail preferred embodiments thereof with reference to the attached drawings in which:

FIG. 1 is a block diagram showing an extended graphics array (XGA) graphics system according to the present invention;

FIGS. 3A through 6B are timing diagrams illustrating operation of the interface unit shown in FIGS. 2A through 2C;

FIGS. 7A through 7C are diagrams showing a second embodiment of the interface unit of FIG. 1;

FIGS. 8A through 11B are timing diagrams illustrating operation of the interface unit shown in FIGS. 7A through 7C;

FIGS. 12A through 12E are timing diagrams illustrating operation of a third embodiment of the interface unit of FIG. 1;

DETAILED DESCRIPTION OF THE PREFERRED EMBODIMENT

Figure 2A:
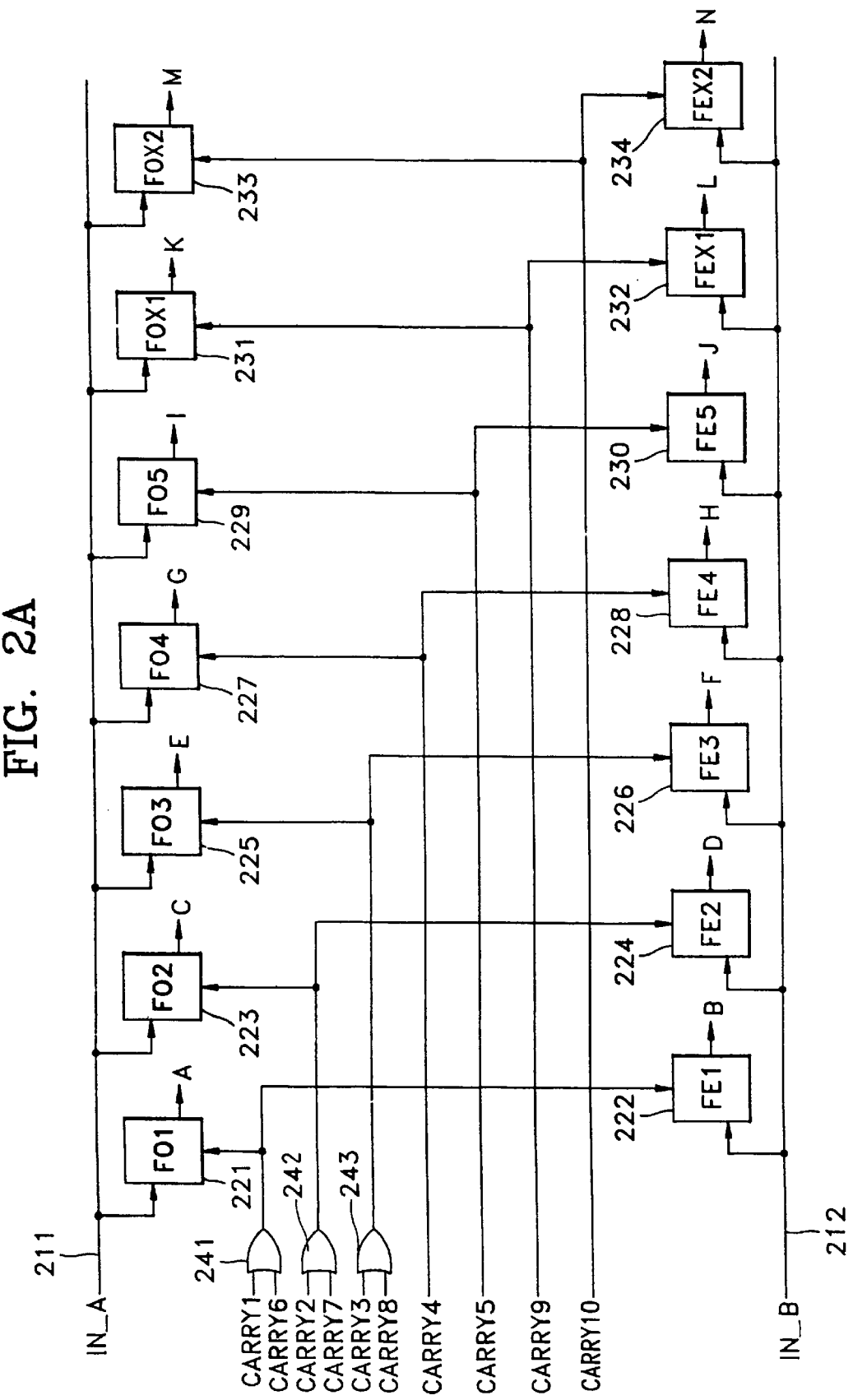
FIGS. 2A through 2C are diagrams showing a first embodiment of an interface unit of FIG. 1.

Referring to FIG. 1, a PC-SET 11 is a computer having an XGA graphics card that generates a control signal and a data signal which are for an XGA graphics mode. The data signal, when transmitted, is divided into odd-number data (IN_A) and even-number data (IN_B).

A source drive unit 15 has two memories for storing a predetermined number N of pixel data, where N is a positive integer, and drives an LCD panel 17 according to the pixel data stored in the memories.

An interface unit 18 includes a carry signal generator 183, a data latch unit 181, an OUT_A output unit 185, and an OUT_B output unit 187 in order to interface the PC-SET 11 with the source drive unit 15.

The carry signal generator 183 generates N carry signals each having a period N times longer than that of the main clock MCLK and an enable state during each period of the main clock MCLK. Here, the enable state of each carry signal is sequentially delayed by one period of the main clock MCLK. The data latch unit 181 includes N or more latches, and even-number data and odd-number data are stored in each latch according to the carry signals. The OUT_A output unit 185 outputs odd-number output data, from among a group of N output data which are sequentially arranged in data latch unit 181, to a first memory (not shown) of source drive unit 15 according to the carry signals. OUT_B output unit 187 outputs even-number output data, from among the N output data units which are sequentially arranged in data latch unit 181, to a second memory (not shown) of source drive unit 15 according to the carry signals.

That is, interface unit 18 sequentially arranges the even-number data and the odd-number data which are transmitted from the PC-SET 11 according to a control signal having a frequency half that of main clock MCLK in order to store N pixel data units in each memory of source drive unit 15, and in turn outputs the sequentially arranged output data to the two memories of the source drive unit 15.

Figure 2B:
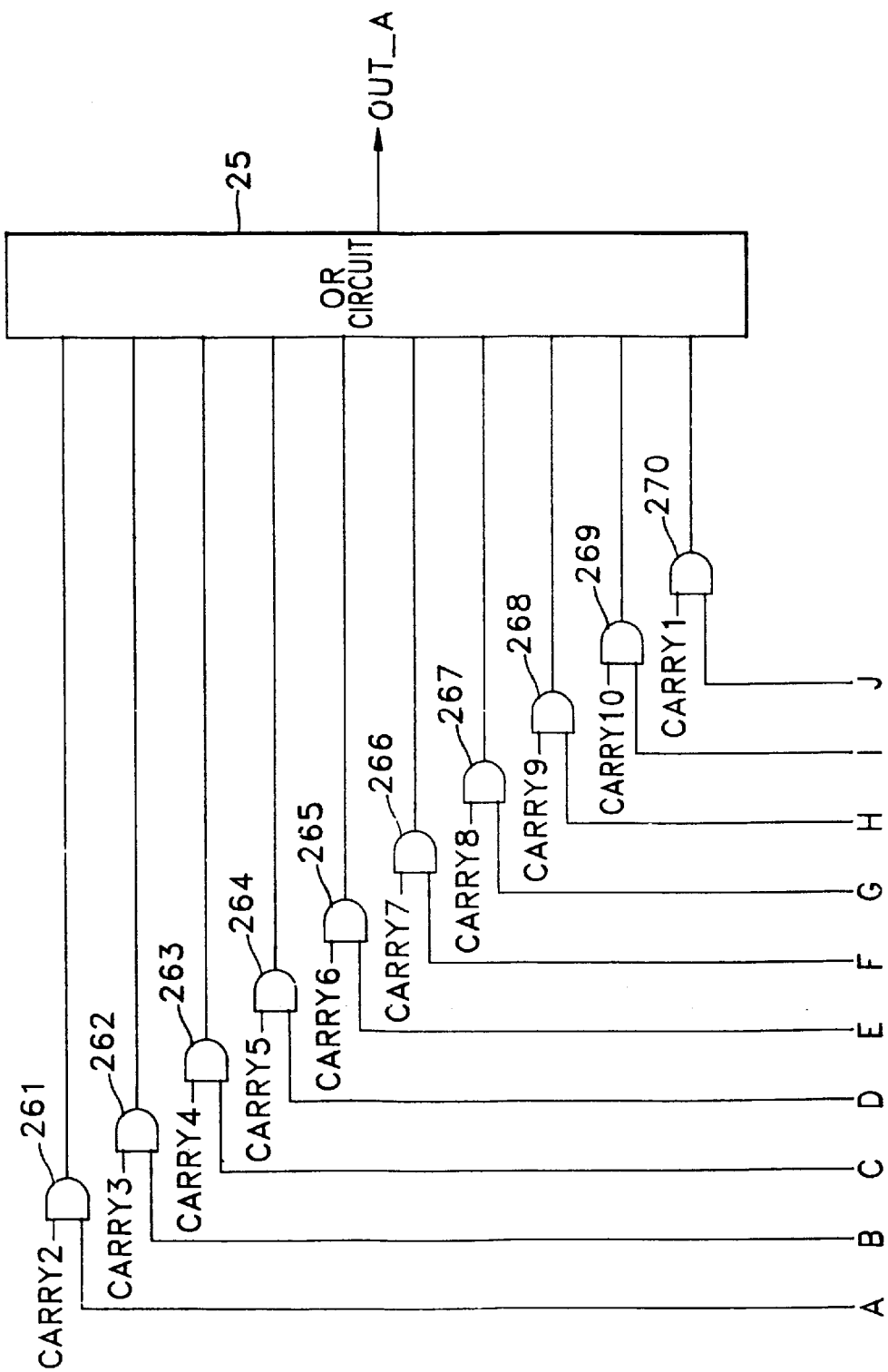
Figure 2C:
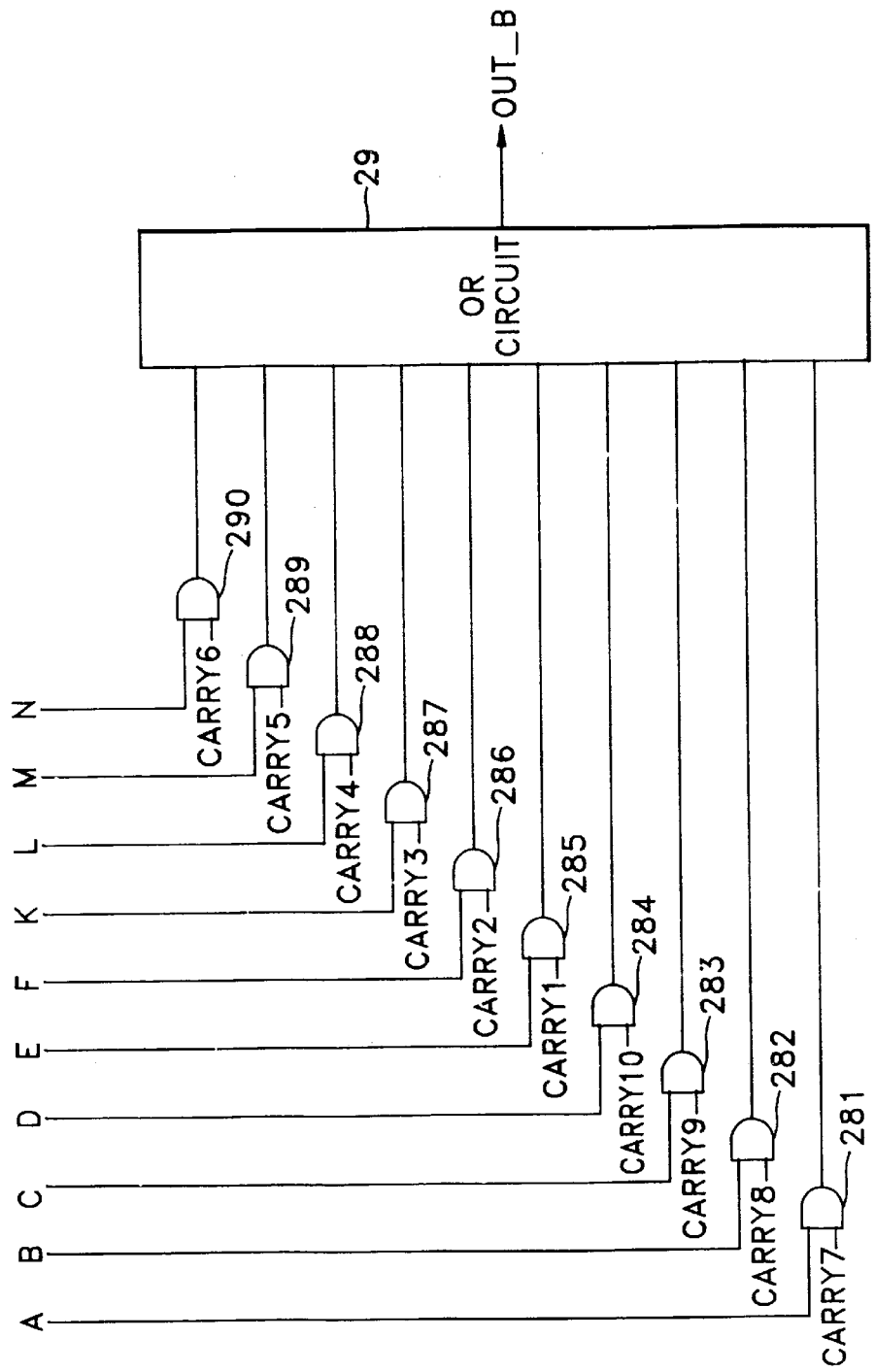

FIGS. 2A through 2C are diagrams showing a structure of interface unit 18 when the number of pixel data stored in each memory of source drive unit 15 of FIG. 1 is even, e.g., when N=2M, where M is a positive integer. FIG. 2A shows a structure of data latch unit 181, FIG. 2B shows a structure of OUT_A output unit 185 and FIG. 2C shows a structure of OUT_B output unit 187. According to the present embodiment, ten pixel data are stored in each memory, where M is 5.

Here, IN_A, which is carried on line 211, denotes odd-number pixel data transmitted from PC-SET 11, IN_B, which is carried on line 212, denotes even-number pixel data transmitted from PC-SET 11, CARRY1 to CARRY10 denote carry signals generated from carry signal generator 183, OUT_A denotes odd-number output data of the group of N output data, and OUT_B denotes even-number output data of the group of N output data.

The data latch unit shown in FIG. 2A includes seven flip-flops for storing IN_A input data indicated by the odd reference numerals 221 to 233, and also includes seven flip-flops for storing IN_B input data indicated by the even reference numerals 222 to 234.

Here, the odd-number flip-flops into which IN_A input data is input, include a first odd-number latch unit having (M−2) latches for inputting first to (M−2)th data out of a group of 2M odd-number pixel data transmitted on line 211, and outputting the latched data according to carry signals, a second odd-number latch unit having two latches for inputting (M−1)th and Mth data of the group of 2M odd-number pixel data transmitted on line 211 and outputting the latched data according to the carry signals, and a third odd-number latch unit having two latches for inputting (2M−1)th and 2Mth data of the group of 2M odd-number pixel data transmitted on line 211 and outputting the latched data according to the carry signals.

Also, even-number flip-flops, where even-number input data is input, include a first even-number latch unit having (M−2) latches for receiving first to (M−2)th data of a group of 2M even-number data transmitted on line 212 and outputting the latched data according to carry signals, a second even-number latch unit having two latches for receiving (M−1)th and Mth data of the group of 2M even-number data transmitted on line 212 and outputting the latched data according to the carry signals, and a third even-number latch unit having two latches for receiving (2M−1)th and 2Mth data of the group of 2M even-number data transmitted on line 212 and outputting the latched data according to the carry signals.

According to the present embodiment, since N=10 and M=5, the first odd-number latch unit includes flip-flops FO1 to FO3 221, 223 and 225, the second odd-number latch unit includes flip-flops FO4 and FO5 227 and 229, the third odd-number latch unit includes flip-flops FOX1 and FOX2 231 and 233. Similarly, the first even-number latch unit includes flip-flops FE1 to FE3 222, 224, and 226, the second even-number latch unit includes flip-flops FE4 and FE5 228 and 230, and the third even-number latch unit includes flip-flops FEX1 and FEX2 232 and 234.

The OUT_A output unit 185 shown in FIG. 2B includes ten AND gates 261 to 270 for receiving the data output from the flip-flops of data latch unit 181 and carry signals from the carry signal generator 183. It also includes an OR circuit 25 for receiving the output signals of AND gates 261 to 270 and outputting OUT_A data. The OUT_A output unit outputs data A, B, C, D, E, F, G, H, I, and J which constitute a group of 2M data transmitted from the first and second odd-number latch units and the first and second even-number latch units of data latch unit 181, according to predetermined carry signals, to the first memory (not shown) of source drive unit 15.

The OUT_B output unit 187 shown in FIG. 2C includes ten AND gates 281 to 290 for receiving data output from the flip-flops of data latch unit 181 and carry signals output from carry signal generator 183. It also includes an OR circuit 29 for receiving the output signals of AND gates 281 to 290 and outputting OUT_B data. The OUT_B output unit 187 outputs data A, B, C, D, E, F, K, L, M and N which constitute a group of 2M data transmitted from the first and third odd-number latch units and the first and third even-number latch units of data latch unit 181, according to predetermined carry signals, to the second memory (not shown) of source drive unit 15.

Referring to FIG. 2A, the procedure for latching input data into each flip-flop according to the carry signals is described as follows.

The first odd-number flip-flop FO1 221 and the first even-number flip-flop FE1 222 latch the input data according to a signal which is obtained by OR-operating the first and sixth carry signals CARRY1 and CARRY6 using OR gate 241. The second odd-number flip-flop FO2 223 and the second even-number flip-flop FE2 224 latch the input data according to a signal which is obtained by OR-operating the second and seventh carry signals CARRY2 and CARRY7 using OR gate 242. The third odd-number flip-flop FO3 225 and the third even-number flip-flop FE3 226 latch the input data according to a signal which is obtained by OR-operating the third and eighth carry signals CARRY3 and CARRY8 using OR gate 243. The fourth odd-number flip-flop FO4 227 and the fourth even-number flip-flop FE4 228 latch the input data according to a fourth carry signal CARRY4. The fifth odd-number flip-flop FO5 229 and the fifth even-number flip-flop FE5 230 latch the input data according to a fifth carry signal CARRY5. The first odd-number extra flip-flop FOX1 231 and the first even-number extra flip-flop FEX1 232 latch the input data according to a ninth carry signal CARRY9. The second odd-number extra flip-flop FOX2 233 and the second even-number extra flip-flop FEX2 234 latch the input data according to a tenth carry signal CARRY10.

Each flip-flop retains the latched data until successive input data are latched by successive carry signals.

Referring to FIG. 2B, the procedure for outputting the data latched in each flip-flop to OUT_A according to the carry signals will be described.

First, the data "A", latched in the first odd-number flip-flop FO1 221, is output to OR circuit 25 during an enable (HIGH) state of the second carry signal CARRY2. Then, the data "B" latched in first even-number flip-flop FE1 222 is output to OR circuit 25 during an enable (HIGH) state of third carry signal CARRY3. Sequentially, the data "C" latched in second odd-number flip-flop FO2 223 is output to OR circuit 25 during an enable (HIGH) state of fourth carry signal CARRY4. The data "D" latched in second even-number flip-flop FE2 224 is output to OR circuit 25 during an enable (HIGH) state of fifth carry signal CARRY5. The data "E" latched in third odd-number flip-flop FO3 225 is output to OR circuit 25 during an enable (HIGH) state of sixth carry signal CARRY6. The data "F" latched in third even-number flip-flop FE3 226 is output to OR circuit 25 during an enable (HIGH) state of seventh carry signal CARRY7. The data "G" latched in fourth odd-number flip-flop FO4 227 is output to OR circuit 25 during an enable (HIGH) state of eighth carry signal CARRY8. The data "H" latched in fourth even-number flip-flop FE4 228 is output to OR circuit 25 during an enable (HIGH) state of ninth carry signal CARRY9. The data "I" latched in fifth odd-number flip-flop FO5 229 is output to OR circuit 25 during an enable (HIGH) state of tenth carry signal CARRY10. The data "J" latched in fifth even-number flip-flop FE5 230 is output to OR circuit 25 during an enable (HIGH) state of first carry signal CARRY1. Here, the data are sequentially output to OR circuit 25.

That is, the OR circuit 25 outputs the output data of the flip-flops selected according to carry signals (when in the "HIGH" state) as OUT_A in the same order as mentioned above. Accordingly, the data A to J latched in the flip-flops are sequentially output as OUT_A by the carry signals CARRY2 to CARRY10 and CARRY1, and the data output as OUT_A is output in a group of 10 units of data such as first to tenth data or twenty-first to thirtieth data.

Referring to FIG. 2C, an operation of outputting the data latched in each flip-flop as OUT_B according to the carry signals will be described.

First, the data A latched in the first odd-number flip-flop FO1 221 is output to OR circuit 29 during an enable (HIGH) state of the seventh carry signal CARRY7. Then, the data B latched in the first even-number flip-flop FE1 222 is output to OR circuit 29 during an enable (HIGH) state of the eighth carry signal CARRY8.

Sequentially, the data C latched in the second odd-number flip-flop FO2 223 is output to OR circuit 29 during an enable (HIGH) state of the ninth carry signal CARRY9. The data D latched in the second even-number flip-flop FE2 224 is output to OR circuit 29 during an enable (HIGH) state of the tenth carry signal CARRY10. The data E latched in the third odd-number flip-flop FO3 225 is output to OR circuit 29 during an enable (HIGH) state of the first carry signal CARRY1. The data F latched in the third even-number flip-flop FE3 226 is output to OR circuit 29 during an enable (HIGH) state of the second carry signal CARRY2. The data K latched in the first odd-number extra flip-flop FOX1 231 is output to OR circuit 29 during an enable (HIGH) state of the third carry signal CARRY3. The data L latched in the first even-number extra flip-flop FEX1 232 is output to OR circuit 29 during an enable (HIGH) state of the fourth carry signal CARRY4. The data M latched in the second odd-number extra flip-flop FOX2 233 is output to OR circuit 29 during an enable (HIGH) state of the fifth carry signal CARRY5. The data N latched in the second even-number extra flip-flop FEX2 234 is output to OR circuit 29 during an enable (HIGH) state of the sixth carry signal CARRY6. Here, the above-mentioned data are sequentially output to OR circuit 29.

That is, OR circuit 29 outputs the data from the flip-flops selected according to enabled (HIGH) carry signals as OUT_B in the same order as mentioned above. Accordingly, the data A to F and K to N latched in the flip-flops are sequentially output as OUT_B according to carry signals CARRY7 to CARRY10 and CARRY1 to CARRY6, respectively. Further, the data output as OUT_B is output in a group of 10 data units such as eleventh to twentieth data or thirty-first to fortieth data.

As mentioned above, OUT_A output is formed from the data latched in first to fifth odd-number flip-flops FO1 to FO5 221, 223, 225, 227, and 229 and from first to the fifth even-number flip-flops FE1 to FE5 222, 224, 226, 228, and 230. OUT_B is formed from the data latched in first to third odd-number flip-flops FO1 to FO3 221, 223 and 225, first to third even-number flip-flops FE1 to FE3 222, 224 and 226, first and second odd-number extra flip-flops FOX1 and FOX2 231 and 233, and first and second even-number extra flip-flops FEX1 and FEX2 232 and 234.

FIGS. 3A through 6B are timing diagrams illustrating the operation of the interface unit shown in FIGS. 2A through 2C.

FIG. 3A shows a waveform for main clock MCLK, FIG. 3B shows a waveform for odd-number input data IN_A, and FIG. 3C shows a waveform for even-number input data IN_B, where the input period of each input data corresponds to the period of the main clock MCLK.

FIGS. 4A through 4J show waveforms for carry signals CARRY1 to CARRY10. First carry signal CARRY1, shown in FIG. 4A, goes "HIGH", or enabled, on the first, eleventh, twenty-first, thirty-first and forty-first, etc. rising edge of main clock MCLK, and goes "Low" on the second, twelfth, twenty-second, thirty-second and forty-second, etc. rising edge of main clock MCLK. For example, CARRY 1 goes "HIGH" on the first rising edge of main clock MCLK and goes "LOW" on the second rising edge (see C1 in FIG. 4A). The second carry signal CARRY2, shown in FIG. 4B, goes "HIGH" on the second, twelfth, twenty-second, thirty-second, and forty-second, etc. rising edge of main clock MCLK, and goes "LOW" on the third, thirteenth, twenty-third, thirty-third, and forty-third, etc. rising edge of main clock MCLK. The third to tenth carry signals, shown in FIGS. 4C to 4J, respectively, are generated in the same manner as mentioned above, and become sequentially HIGH in the order in which the carry signals are numbered. Here, the period of the enabled carry signal is delayed from that of main clock MCLK. The period of every carry signal is N times longer than that of main clock MCLK, and the duty cycle thereof is $1/N \times 100\%$. In this embodiment N=10 and the duty cycle is 10%.

FIGS. 5A through 5N show data latched in flip-flops FO1 to FO5, FE1 to FE5, FOX1, FOX2, FEX1, and FEX2 for each cycle. Numerals shown in the waveforms denote the order of the input data, and CX shown above the input data, where X is 1 to 20, denotes the order of the carry signals for latching the input data into the flip-flops.

FIG. 6A shows data output to the first memory of the source drive unit 15 and FIG. 6B shows data output to the second memory of the source drive unit 15.

The operation of each flip-flop to latch input data according to the carry signals will be described below in detail.

In the first odd-number flip-flop FO1 221, the first data is latched according to C1, corresponding to first carry signal CARRY1, the eleventh data is latched according to C6, corresponding to sixth carry signal CARRY6, the twenty-first data is latched according to C11, corresponding to first carry signal CARRY1, and the thirty-first data is latched according to C6, corresponding to sixth carry signal CARRY6. Generally, data is latched in the above-described manner such that the (N×k+1)th data is latched according to the first and sixth carry signals, where N=10 and k=0, 1, 2, 3, . . . .

In the first even-number flip-flop FE1 222, the second data is latched according to C1, corresponding to first carry signal CARRY1, the twelfth data is latched according to C6, corresponding to sixth carry signal CARRY6, the twenty-second data is latched according to C1, corresponding to first carry signal CARRY1, the thirty-second data is latched according to C16, corresponding to sixth carry signal CARRY6. Generally, data is latched In the above-described manner, such that the (N×k+2)th data is latched according to the first and sixth carry signals.

In the second odd-number flip-flop FO2 223, the third data is latched according to C2, corresponding to second carry signal CARRY2, the thirteenth data is latched according to C7, corresponding to seventh carry signal CARRY7, the twenty-third data is latched according to C12, corresponding to second carry signal CARRY2, the thirty-third data is latched according to C17, corresponding to seventh carry signal CARRY7. Generally, data is latched In the above-described manner, such that the (N×k+3)th data is latched according to the second and seventh carry signals.

In the second even-number flip-flop FE2 224, the fourth data is latched according to C2, corresponding to second carry signal CARRY2, the fourteenth data is latched according to C7, corresponding to seventh carry signal CARRY7, the twenty-fourth data is latched according to C12, corresponding to second carry signal CARRY2, the thirty-fourth data is latched according to C17, corresponding to seventh carry signal CARRY7. Generally, data is latched In the above-described manner, such that the (N×k+4)th data is latched according to the second and seventh carry signals.

In the third odd-number flip-flop FO3 225, the fifth data is latched according to C3, corresponding to third carry signal CARRY3, the fifteenth data is latched according to C8, corresponding to eighth carry signal CARRY8, the twenty-fifth data is latched according to C13, corresponding to third carry signal CARRY3, the thirty-fifth data is latched according to C18, corresponding to eighth carry signal CARRY8. Generally, data is latched. In the above-described manner, such that the (N×k+5)th data is latched according to the third and eighth carry signals.

In the third even-number flip-flop FE3 226, the sixth data is latched according to C3, corresponding to third carry signal CARRY3, the sixteenth data is latched according to C8, corresponding to eighth carry signal CARRY8, the twenty-sixth data is latched according to C13, corresponding to third carry signal CARRY3, the thirty-sixth data is latched according to C18, corresponding to eighth carry signal CARRY8. Generally, data is latched In the above-described manner, such that the (N×k+6)th data is latched according to the third and eighth carry signals.

In the fourth odd-number flip-flop FO4 227, the seventh data is latched according to C4, corresponding to fourth carry signal CARRY4, the twenty-seventh data is latched according to C14, corresponding to fourth carry signal CARRY4. In the above-mentioned manner, (N×2k+7)th data is latched according to the fourth carry signal.

In the fourth even-number flip-flop FE4 228, the eighth data is latched according to C4, corresponding to fourth carry signal CARRY4, the twenty-eighth data is latched according to C14, corresponding to fourth carry signal CARRY4. Generally, data is latched In the above-described manner, such that the (N×2k+8)th data is latched according to the fourth carry signal.

In the fifth odd-number flip-flop FO5 229, the ninth data is latched according to C5, corresponding to fifth carry signal CARRY5, the twenty-ninth data is latched according to C15, corresponding to fifth carry signal CARRY5. Generally, data is latched In the above-described manner, such that the (N×2k+9)th data is latched according to the fifth carry signal.

In the fifth even-number flip-flop FE5 230, the tenth data is latched according to C5, corresponding to fifth carry signal CARRY5, the thirtieth data is latched according to C15, corresponding to fifth carry signal CARRY5. Generally, data is latched. In the above-described manner, such that the (N×2k+10)th data is latched according to the fifth carry signal.

In the first odd-number extra flip-flop FOX1 231, the seventeenth data is latched according to C9, corresponding to ninth carry signal CARRY9, the thirty-seventh data is latched according to C19, corresponding to ninth carry signal CARRY9. Generally, data is latched in the above-described manner such that the (N×2k+17)th data is latched according to the ninth carry signal.

In the first even-number extra flip-flop FEX1 232, the eighteenth data is latched according to C9, corresponding to ninth carry signal CARRY9, the thirty-eighth data is latched according to C19, corresponding to ninth carry signal CARRY9. Generally, data is latched in the above-described manner, such that the (N×2k+18)th data is latched according to the ninth carry signal.

In the second odd-number extra flip-flop FOX2 233, the nineteenth data is latched according to C10, corresponding to tenth carry signal CARRY10, the thirty-ninth data is latched according to C20, corresponding to tenth carry signal CARRY10. Generally, data is latched in the above-described manner, such that the (N×2k+19)th data is latched according to the tenth carry signal.

In the second even-number extra flip-flop FEX2 234, the twentieth data is latched according to C10, corresponding to tenth carry signal CARRY10, the fortieth data is latched according to C20, corresponding to tenth carry signal CARRY10. Generally, data is latched in the above-described manner, such that the (N×2k+20)th data is latched according to the tenth carry signal.

The process whereby each flip-flop latches the input data for twenty periods of the main clock MCLK, C1 to C20, is repeatedly performed, for every forty data inputs.

Now, the process whereby the latched data in each flip-flop is output to OUT_A and OUT_B according to the carry signals will be described in detail.

The first to tenth data and twenty-first to thirtieth data is sequentially output as OUT_A, and the eleventh to twentieth data and thirty-first to fortieth data is sequentially output as OUT_B. The data output as OUT_A and OUT_B are simultaneously formed except during a few initial cycles of main clock MCLK.

The first to tenth data output as OUT_A are formed from the data latched in the first to fifth odd-number flip-flops and the first to fifth even-number flip-flops. The order of the data output according to the carry signals is described as follows.

The first data latched in the first odd-number flip-flop FO1 221 is output according to C2, corresponding to second carry signal CARRY2, and the second data latched in the first even-number flip-flop FE1 222 is output according to C3, corresponding to third carry signal CARRY3.

The third data latched in the second odd-number flip-flop FO2 223 is output according to C4, corresponding to fourth carry signal CARRY4, and the fourth data latched in the second even-number flip-flop FE2 224 is output according to C5, corresponding to fifth carry signal CARRY5.

The fifth data latched in the third odd-number flip-flop FO3 225 is output according to C6, corresponding to sixth carry signal CARRY6, and the sixth data latched in the third even-number flip-flop FE3 226 is output according to C7, corresponding to seventh carry signal CARRY7.

The seventh data latched in the fourth odd-number flip-flop FO4 227 is output according to C8, corresponding to eighth carry signal CARRY8, and the eighth data latched in the fourth even-number flip-flop FE4 228 is output according to C9, corresponding to ninth carry signal CARRY9.

The ninth data latched in the fifth odd-number flip-flop FO5 229 is output according to C10, corresponding to tenth carry signal CARRY10, and the tenth data latched in the fifth even-number flip-flop FE5 230 is output according to C11, corresponding to first carry signal CARRY1.

The eleventh to twentieth data output from OUT_B are formed, corresponding to data latched in the first to third odd-number flip-flops and first to third even-number flip-flops, the first and second odd-number extra flip-flops, and the first and second even-number extra flip-flops. The order of outputting the data according to the carry signals is described as follows.

The eleventh data latched in the first odd-number flip-flop FO1 221 is output according to C7, corresponding to seventh carry signal CARRY7, and the twelfth data latched in the first even-number flip-flop FE1 222 is output according to C8, corresponding to eighth carry signal CARRY8.

The thirteenth data latched in the second odd-number flip-flop FO2 223 is output according to C9, corresponding to ninth carry signal CARRY9, and the fourteenth data latched in the second even-number flip-flop FE2 224 is output according to C10, corresponding to tenth carry signal CARRY10.

The fifteenth data latched in the third odd-number flip-flop FO3 225 is output according to C11, corresponding to first carry signal CARRY1, and the sixteenth data latched in the third even-number flip-flop FE3 226 is output according to C12, corresponding to second carry signal CARRY2.

The seventeenth data latched in the first odd-number extra flip-flop FOX1 231 is output according to C13, corresponding to third carry signal CARRY3, and the eighteenth data latched in the first even-number extra flip-flop FEX1 232 is output according to C14, corresponding to fourth carry signal CARRY4.

The nineteenth data latched in the second odd-number extra flip-flop FOX2 233 is output according to C15, corresponding to fifth carry signal CARRY5, and the twentieth data latched in the second even-number extra flip-flop FEX2 234 is output according to C16, corresponding to sixth carry signal CARRY6.

Data input/output operations in the interface unit according to the period of the carry signals will be described as follows.

The first and second data during C1, corresponding to first carry signal CARRY1 are latched in the first odd-number flip-flop FO1 221 and first even-number flip-flop FE1 222, respectively, and the latched data are maintained until C6, corresponding to sixth carry signal CARRY6 is generated.

The third and fourth data are latched in the second odd-number flip-flop FO2 223 and the second even-number flip-flop FE2 224, respectively, during C2, corresponding to second carry signal CARRY2, and these latched data are maintained until C7 is generated, corresponding to when seventh carry signal CARRY7. Also, at C2 the first data latched in the first odd-number flip-flop FO1 221 is simultaneously output to OUT_A.

The fifth and sixth data during C3, corresponding to third carry signal CARRY3, are latched in the third odd-number flip-flop FO3 225 and third even-number flip-flop FE3 226, respectively, and the latched data are maintained until C8, corresponding to eighth carry signal CARRY8, is generated. Also, the second data latched in the first even-number flip-flop FE1 222 is simultaneously output to OUT_A at C3.

The seventh and eighth data during C4, corresponding to fourth carry signal CARRY4, are latched in the fourth odd-number flip-flop FO4 227 and fourth even-number flip-flop FE4 228, respectively, and the latched data are maintained until C14, corresponding to fourth carry signal CARRY4, is generated. Also, the third data latched in the second odd-number flip-flop FO2 223 is simultaneously output to OUT_A at C4.

The ninth and tenth data during C5, corresponding to fifth carry signal CARRY5, are latched in the fifth odd-number flip-flop FO5 229 and fifth even-number flip-flop FO5 230, respectively, and the latched data are maintained until C15, corresponding to fifth carry signal CARRY5, is generated. Also, the fourth data latched in the second even-number flip-flop FE2 224 is simultaneously output to OUT_A at C5.

The eleventh and twelfth data during C6, corresponding to sixth carry signal CARRY6, are latched in the first odd-number flip-flop FO1 221 and first even-number flip-flop FE1 222, respectively, and the latched data are maintained until C11, corresponding to first carry signal CARRY1, is generated. Also, the fifth data latched in the third odd-number flip-flop FO3 225 is simultaneously output to OUT_A at C6.

The thirteenth and fourteenth data during C7, corresponding to seventh carry signal CARRY7, are latched in the second odd-number flip-flop FO2 223 and second even-number flip-flop FE2 224, respectively, and the latched data are maintained until C12, corresponding to second carry signal CARRY2, is generated. Also, the sixth data latched in the third even-number flip-flop FE3 226 and the eleventh data latched in the first odd-number flip-flop FO1 221 are simultaneously output to OUT_A and OUT_B, respectively, at C7.

The fifteenth and sixteenth data during C8, corresponding to eighth carry signal CARRY8, are latched in the third odd-number flip-flop FO3 225 and third even-number flip-flop FE3 226, respectively, and the latched data are maintained until C13, corresponding to third carry signal CARRY3, is generated. Also, the seventh data latched in the fourth odd-number flip-flop FO4 227 and the twelfth data latched in the first even-number flip-flop FE1 222 are simultaneously output to OUT_A and OUT_B, respectively, at C8.

The seventeenth and eighteenth data during C9, corresponding to ninth carry signal CARRY9, are latched in the first odd-number extra flip-flop FOX1 231 and first even-number extra flip-flop FEX1 232, respectively, and the latched data are maintained until C19, corresponding to ninth carry signal CARRY9, is generated. Also, the eighth data latched in the fourth even-number flip-flop FE4 228 and the thirteenth data latched in the second odd-number flip-flop FO2 223 are simultaneously output to OUT_A and OUT_B, respectively, at C9.

The nineteenth and twentieth data during C10, corresponding to tenth carry signal CARRY10, are latched in the second odd-number extra flip-flop FOX2 233 and second even-number extra flip-flop FEX2 234, respectively, and the latched data are maintained until C20, corresponding to tenth carry signal CARRY10, is generated. Also, the ninth data latched in the fifth odd-number flip-flop FO5 229 and the fourteenth data latched in the second even-number flip-flop FE2 224 are simultaneously output to OUT_A and OUT_B, respectively, at C10.

The twenty-first and twenty-second data during C1, corresponding to first carry signal CARRY1, are latched in the first odd-number flip-flop FO1 221 and first even-number flip-flop FE1 222, respectively, and the latched data are maintained until C16, corresponding to sixth carry signal CARRY6, is generated. Also, the tenth data latched in the fifth even-number flip-flop FE5 230 and the fifteenth data latched in the third odd-number flip-flop FO3 225 are simultaneously output to OUT_A and OUT_B, respectively, at C11.

The twenty-third and twenty-fourth data during C12, corresponding to second carry signal CARRY2, are latched in the second odd-number flip-flop FO2 223 and second even-number flip-flop FE2 224, respectively, and the latched data are maintained until C17, corresponding to seventh carry signal CARRY7, is generated. Also, the twenty-first data latched in the first odd-number flip-flop FO1 221 and the sixteenth data latched in the third even-number flip-flop FE3 226 are simultaneously output to OUT_A and OUT_B, respectively, at C12.

Referring to the timing diagrams shown in FIGS. 3A through 6B, in the same manner as mentioned above, the operations of other cycles can also be easily understood.

Accordingly, the procedure for latching data in each flip-flop is summarized as follows.

The data are latched in the first odd-number flip-flop and first even-number flip-flop according to the first and sixth carry signals, in the second odd-number flip-flop and second even-number flip-flop according to the second and seventh carry signals, and in the third odd-number flip-flop and third even-number flip-flop according to the third and eighth carry signals, respectively. However, the data are latched in the fourth odd-number flip-flop and fourth even-number flip-flop only according to the fourth carry signal and in the fifth odd-number flip-flop and fifth even-number flip-flop only according to the fifth carry signal. The data are latched in the first odd-number extra flip-flop and first even-number extra flip-flop only according to the ninth carry signal and in the second odd-number extra flip-flop and second even-number extra flip-flop only according to the tenth carry signal.

The procedure of outputting the data latched in each flip-flop is summarized as follows.

The first to tenth data output to OUT_A are sequentially output according to the second to tenth and the first carry signals C2, C3, . . . , C10, C11. Also, the twenty-first to thirtieth data and forty-first to fiftieth data are output in the same manner as mentioned above. The eleventh to twentieth data output to OUT_B are sequentially output according to the seventh to tenth and the first to sixth carry signals, C7, C8, C9, C10, C11, C12, . . . , C16. Also, the thirty-first to fortieth data and fifty-first to sixtieth data are output in the same manner as mentioned above.

Even if the memory capacity of the source drive unit 15 is increased, the input/output data operations will be performed in the same manner as mentioned above. For example, when the number "N" of output data is 100, 100 carry signals, 50 even-number flip-flops, 50 odd-number flip-flops, and 4 extra flip-flops are needed. Here, the first to forty-eighth odd-number flip-flops and first to forty-eighth even-number flip-flops operate in the same manner as the first to third odd-number flip-flops and first to third even-number flip-flops of the above embodiment. Also, the forty-ninth and fiftieth odd-number flip-flops and forty-ninth and fiftieth even-number flip-flops operate in the same manner as the fourth and fifth odd-number flip-flops and the fourth and fifth even-number flip-flops of the above embodiment. Further, the four extra flip-flops operate in the same manner as the first and second odd-number extra flip-flops and the first and second even-number extra flip-flops of the above embodiment.

Figure 7A:
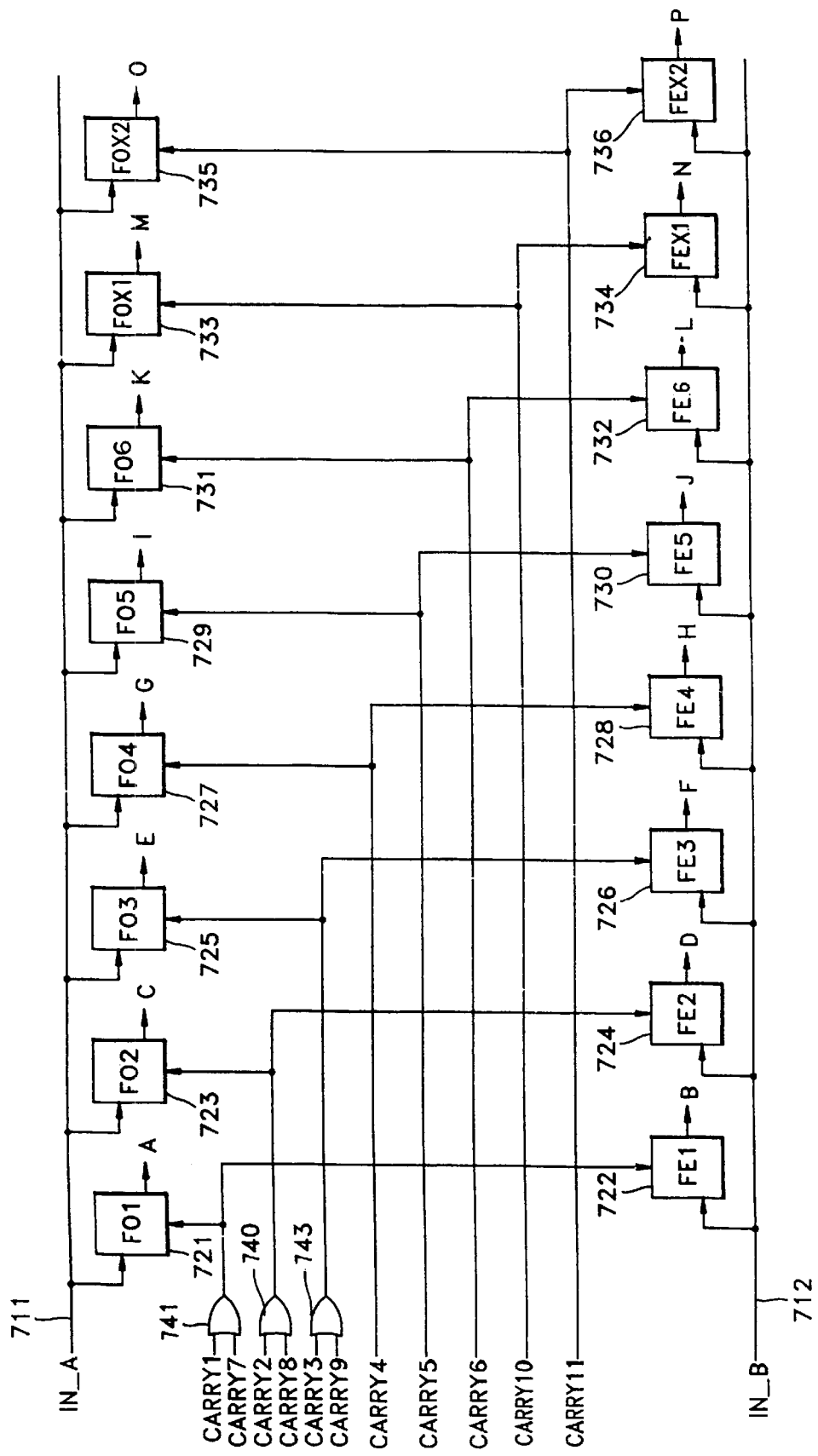
Figure 13:
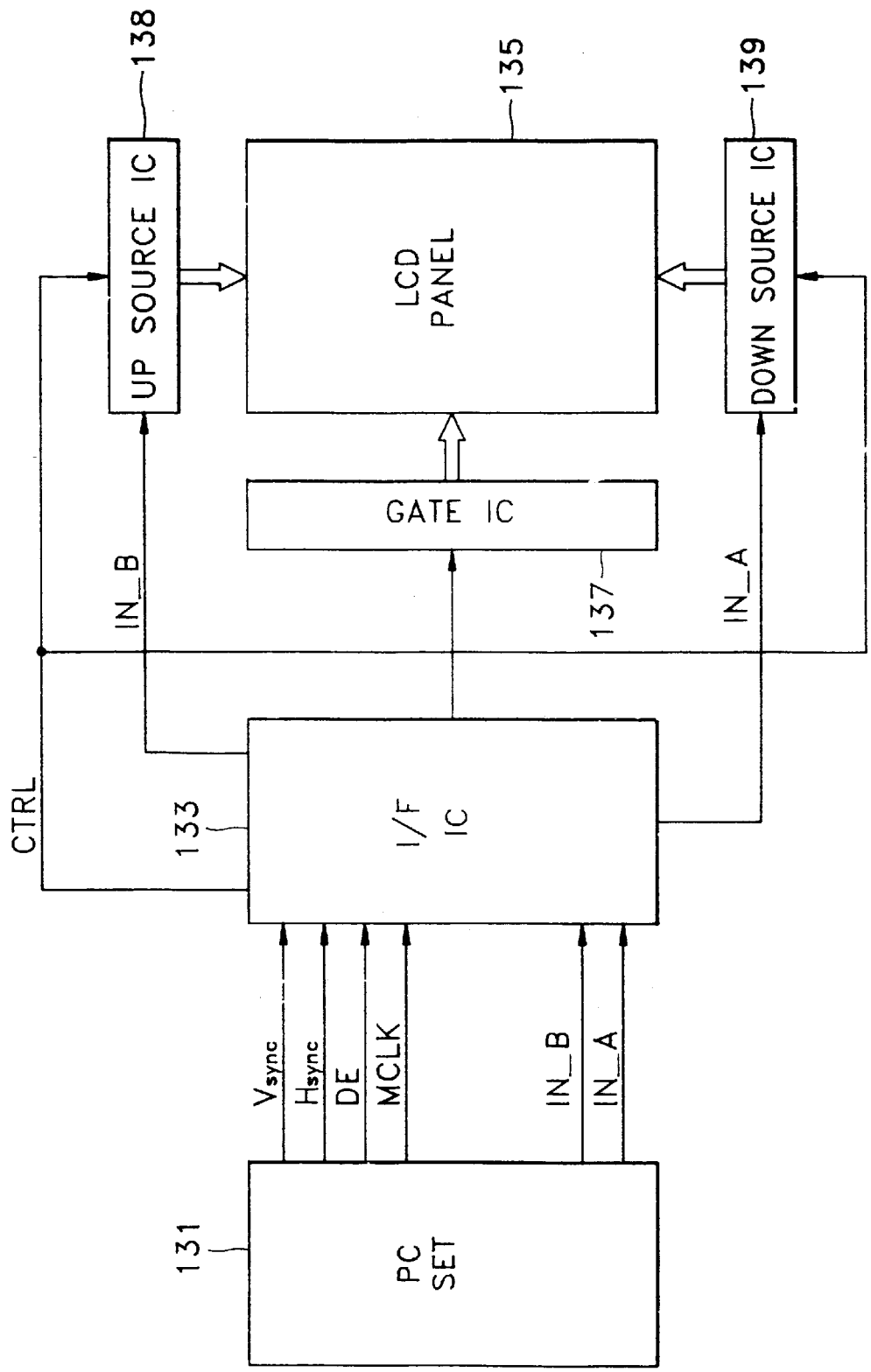
FIG. 13 is a block diagram showing a structure of a conventional graphics system.
Figure 14:
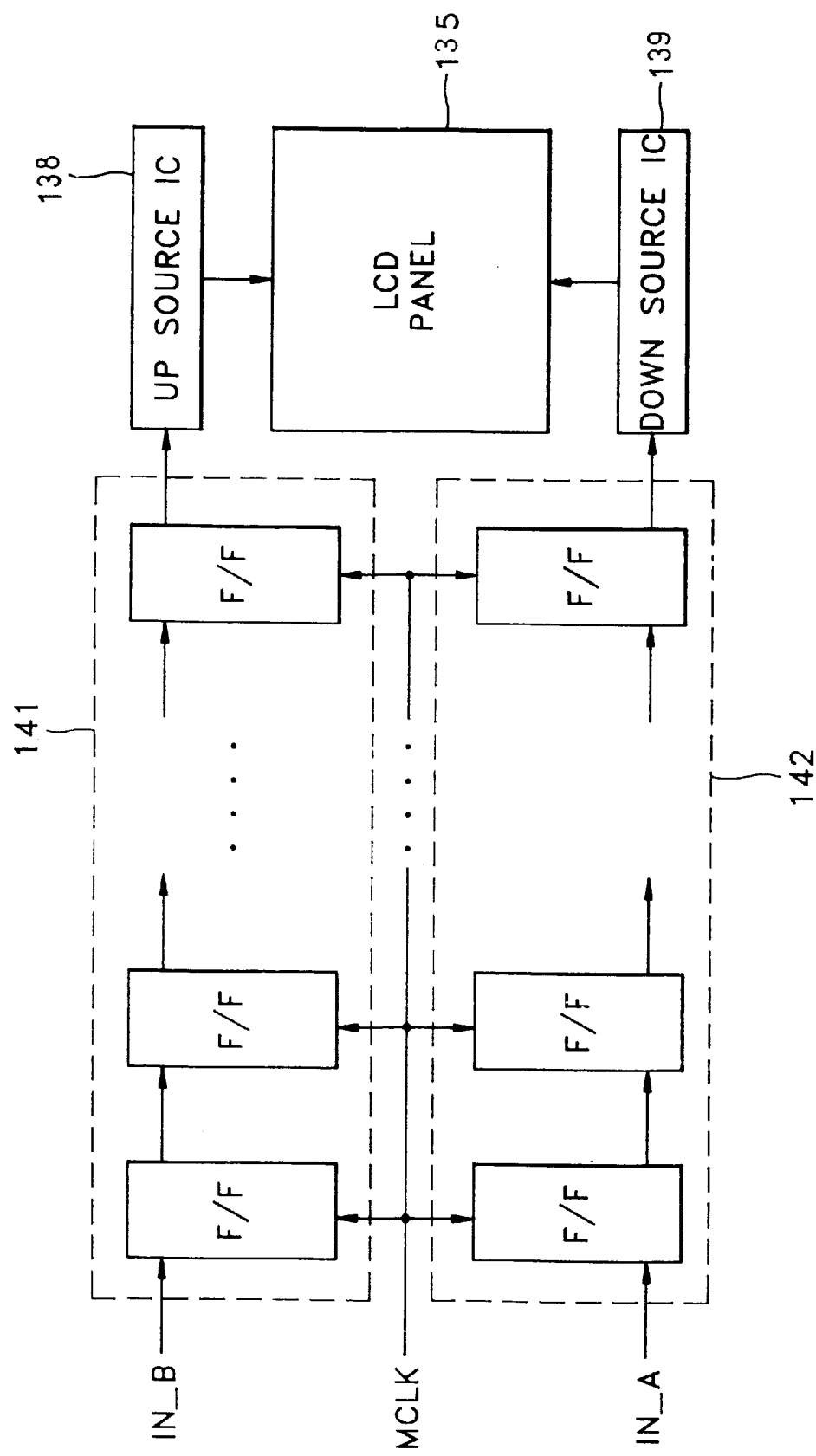
FIG. 14 is a diagram illustrating operation of the interface unit of FIG. 13.

FIGS. 7A through 7C are diagrams showing in detail the structure of interface unit 18 when the number of pixel data stored in each memory of source drive unit 15, shown in FIG. 1, is an odd amount "N", where "N" is 2M+1, and "M" is a positive integer. FIG. 7A shows a structure of data latch unit 181, and FIG. 7B shows a structure of OUT_A output unit 185, and FIG. 7C shows a structure of OUT_B output unit 187. In the present embodiment, 11 pixel data are stored in the memory, where M=5.

Here, IN_A, which is carried on line 711, denotes odd-number pixel data transmitted from PC-SET 11, IN_B, which is carried on line 712, denotes even-number pixel data transmitted from PC-SET 11, CARRY1 to CARRY11 denote carry signals generated from carry signal generator 183, OUT_A denotes a group of N odd-number output data, and OUT_B denotes a group of N even-number output data.

The data latch unit shown in FIG. 7A includes eight flip-flops; FO1 to FO6, 721, 723, 725, 727, 729, and 731 as well as FOX1 733 and FOX2 735 into which IN_A is input. Also included are eight flip-flops; FE1 to FE6, 722, 724, 726, 728, 730, and 732, as well as FEX1 734 and FEX2 736, into which IN_B is input.

Here, the odd-number flip-flops, into which odd-number input data are input, include a first odd-number latch unit having (M−2) latches for inputting first to (M−2)th data and (M+2)th to (2M−1)th data of a group of (2M+1) odd-number data transmitted over line 711 and outputting the latched data according to carry signals, a second odd-number latch unit having three latches for inputting (M−1)th, Mth, and (M+1)th data from the group of (2M+1) odd-number data transmitted over line 711 and outputting the latched data according to the carry signals, and a third odd-number latch unit having two latches for inputting 2Mth and (2M+1)th data from the group of (2M+1) odd-number data transmitted over line 711 and outputting the latched data according to the carry signals.

Also, even-number flip-flops, where even-number input data are input, include a first even-number latch unit having (M−2) latches for inputting first to (M−2)th data and (M+2)th to (2M−1)th data from the group of (2M+1) even-number data transmitted over line 712 and outputting the latched data according to carry signals, a second even-number latch unit having three latches for inputting (M−1)th, Mth, and (M+1)th data from a group of (2M+1) even-number data transmitted over line 712 and outputting the latched data according to the carry signals, and a third even-number latch unit having two latches for inputting 2Mth and (2M+1)th data from the group of (2M+1) even-number data transmitted over line 712 and outputting the latched data according to the carry signals.

According to the present embodiment, N=11 and M=5 so that the first odd-number latch unit includes flip-flops FO1 to FO3 721, 723, and 725, the second odd-number latch unit includes flip-flops FO4 to FO6 727, 729, and 731, and the third odd-number latch unit includes flip-flops FOX1 733 and FOX2 735. Also, the first even-number latch unit includes flip-flops FE1 to FE3 722, 724, and 726, the second even-number latch unit includes flip-flops FE4 to FE6 728, 730, and 732 and the third even-number latch unit includes flip-flops FEX1 734 and FEX2 736.

The OUT_A output unit shown in FIG. 7B includes eleven AND gates 761 to 771, where output data from the flip-flops and carry signals are input, and an OR circuit 75 for inputting the signals output from AND gates 761 to 771 and outputting OUT_A. Here, the OUT_A output unit outputs data A, B, C, D, E, F, G, H, I, J, and K, which forms a group of (2M+1) data transmitted from the first and second odd-number latch units and the first and second even-number latch units to the first memory (not shown) of the source drive unit 15 according to predetermined carry signals.

The OUT_B output unit shown in FIG. 7C includes eleven AND gates 781 to 791 where output data of the flip-flops and carry signals are received, and an OR circuit 79 for inputting the signals output from AND gates 781 to 791 and outputting OUT_B. Here, the OUT_B output unit outputs data A, B, C, D, E, F, M, N, O, P, and L which are a group of (2M+1) data transmitted by the first and third odd-number latch units, the first and third even-number latch units, and flip-flop FE6 of the second even number latch unit, to the second memory (not shown) of source drive unit 15 according to predetermined signals.

Referring to FIG. 7A, the procedure for latching input data in each flip-flop according to the carry signals will be described.

The first odd-number flip-flop FO1 721 and first even-number flip-flop FE1 722 latch the input data according to a signal which is obtained by OR-operating the first and seventh carry signals CARRY1 and CARRY7 using OR gate 741. The second odd-number flip-flop FO2 723 and second even-number flip-flop FE2 724 latch the input data according to a signal which is obtained by OR-operating the second and eighth carry signals CARRY2 and CARRY8 using OR gate 740. The third odd-number flip-flop FO3 725 and third even-number flip-flop FE3 726 latch the input data according to a signal which is obtained by OR-operating the third and ninth carry signals CARRY3 and CARRY9 using an OR gate 743. The fourth odd-number flip-flop FO4 727 and the fourth even-number flip-flop FE4 728 latch the input data according to a fourth carry signal CARRY4. The fifth odd-number flip-flop FO5 729 and fifth even-number flip-flop FE5 730 latch the input data according to a fifth carry signal CARRY5. The sixth odd-number flip-flop FO6 731 and sixth even-number flip-flop FE6 732 latch the input data according to a sixth carry signal CARRY6. The first odd-number extra flip-flop FOX1 733 and first even-number extra flip-flop FEX1 734 latch the input data according to a tenth carry signal CARRY10. The second odd-number extra flip-flop FOX2 735 and second even-number extra flip-flop FEX2 736 latch the input data according to an eleventh carry signal CARRY11.

Each flip-flop retains the latched data until successive input data are latched according to successive carry signals.

Referring to FIG. 7B, the procedure for outputting the data latched in each flip-flop according to the carry signals will be described.

First, the data "A" latched in the first odd-number flip-flop FO1 721 is output to OR circuit 75 during an enable (HIGH) state of the second carry signal CARRY2. Then, the data "B" latched in the first even-number flip-flop FE1 722 is output to OR circuit 75 during an enable (HIGH) state of the third carry signal CARRY3. Sequentially, the data "C" latched in the second odd-number flip-flop FO2 723 is output to OR circuit 75 during an enable (HIGH) state of the fourth carry signal CARRY4. The data "D" latched in the second even-number flip-flop FE2 724 is output to OR circuit 75 during an enable (HIGH) state of the fifth carry signal CARRY5. The data "E" latched in the third odd-number flip-flop FO3 725 is output to OR circuit 75 during an enable (HIGH) state of the sixth carry signal CARRY6. The data "F" latched in the third even-number flip-flop FE3 726 is output to OR circuit 75 during an enable (HIGH) state of the seventh carry signal CARRY7. The data "G" latched in the fourth odd-number flip-flop FO4 727 is output to OR circuit 75 during an enable (HIGH) state of the eighth carry signal CARRY8. The data "H" latched in the fourth even-number flip-flop FE4 728 is output to OR circuit 75 during an enable (HIGH) state of the ninth carry signal CARRY9. The data "I" latched in the fifth odd-number flip-flop FO5 729 is output to OR circuit 75 during an enable (HIGH) state of the tenth carry signal CARRY10. The data "J" latched in the fifth even-number flip-flop FE5 730 is output to OR circuit 75 during an enable (HIGH) state of the eleventh carry signal CARRY11. The data "K" latched in the sixth odd-number flip-flop FO6 731 is output to OR circuit 75 during an enable (HIGH) state of the first carry signal CARRY1. Here, the data are sequentially output to OR circuit 75.

That is, OR circuit 75 outputs to OUT_A the data output from the flip-flops selected according to carry "HIGH" signals, in the same order as discussed above. Accordingly, the data A to K latched in the flip-flops are sequentially output to OUT_A according to carry signals CARRY2 to CARRY11 and CARRY1, in which the data output as OUT_A has eleven data units within a group, such as first to eleventh data or twenty-third to thirty-third data.

Referring to FIG. 7C, the procedure for outputting the data latched in each flip-flop according to the carry signals will be described.

First, the data A latched in the first odd-number flip-flop FO1 721 is output to OR circuit 79 during an enable (HIGH) state of the eighth carry signal CARRY8. Then, the data B latched in the first even-number flip-flop FE1 722 is output to OR circuit 79 during an enable (HIGH) state of the ninth carry signal CARRY9. Sequentially, the data C latched in the second odd-number flip-flop FO2 723 is output to OR circuit 79 during an enable (HIGH) state of the tenth carry signal CARRY10. The data D latched in the second even-number flip-flop FE2 724 is output to OR circuit 79 during an enable (HIGH) state of the eleventh carry signal CARRY11. The data E latched in the third odd-number flip-flop FO3 725 is output to OR circuit 79 during an enable (HIGH) state of the first carry signal CARRY1. The data F latched in the third even-number flip-flop FE3 726 is output to OR circuit 79 during an enable (HIGH) state of the second carry signal CARRY2. The data M latched in the first odd-number extra flip-flop FOX1 733 is output to OR circuit 79 during an enable (HIGH) state of the third carry signal CARRY3. The data N latched in the first even-number extra flip-flop FEX1 734 is output to OR circuit 79 during an enable (HIGH) state of the fourth carry signal CARRY4. The data O latched in the second odd-number extra flip-flop FOX2 735 is output to OR circuit 79 during an enable (HIGH) state of the fifth carry signal CARRY5. The data P latched in the second even-number extra flip-flop FEX2 736 is output to OR circuit 79 during an enable (HIGH) state of the sixth carry signal CARRY6. The data L latched in the sixth even-number flip-flop FE6 732 is output to OR circuit 79 during an enable (HIGH) state of the seventh carry signal CARRY7. Here, the data are sequentially output to OR circuit 79.

That is, OR circuit 79 outputs the data of flip-flops selected according to carry "HIGH" signals as OUT_B in the above-mentioned order. Accordingly, the data A to F, M to P and L latched in the flip-flops are sequentially output to OUT_B according to the carry signals CARRY8 to CARRY11 and CARRY1 to CARRY7.

Further, a unit of the data output to OUT_B includes eleven units of data such as twelfth to twenty-second data or thirty-fourth to forty-fourth data.

As discussed above, the OUT_A output is formed from the data latched in first to sixth odd-number flip-flops FO1 to FO6 and in first to fifth even-number flip-flops FE1 to FE5. The OUT_B output is formed from the data latched in first to third odd-number flip-flops FO1 to FO3, in first to third even-number flip-flops FE1 to FE3, in the sixth even-number flip-flop FE6, in first and second odd-number extra flip-flops FOX1, and FOX2, and in first and second even-number extra flip-flops FEX1 and FEX2.

FIGS. 8A through 11B are timing diagrams illustrating the operation of the interface unit shown in FIGS. 7A through 7C.

FIG. 8A shows a waveform of main clock MCLK, FIG. 8B shows a waveform of the odd-number input data IN_A, and FIG. 8C shows a waveform of the even-number input data IN_B, where the input period of each input data corresponds to the period of main clock MCLK.

FIGS. 9A through 9K show waveforms for the carry signals CARRY1 to CARRY11. The first carry signal CARRY1 shown in FIG. 9A goes "HIGH" on the first rising edge of main clock MCLK and goes "LOW" on the second rising edge of main clock MCLK (see C1), and "HIGH" again on the twelfth rising edge of MCLK and "LOW" again on the thirteenth rising edge of MCLK (see C12). That is, the first carry signal CARRY1 goes "HIGH" on the first, twelfth, twenty-third, thirty-fourth, and the forty-fifth, etc. rising edge of main clock MCLK, and goes "LOW" on the second, thirteenth, twenty-fourth, thirty-fifth, and forty-sixth, etc. rising edge of main clock MCLK. The second carry signal CARRY2 shown in FIG. 9B goes "HIGH" on the second, thirteenth, twenty-fourth, and thirty-fifth, etc. rising edge of main clock MCLK and goes "LOW" on the third, fourteenth, twenty-fifth, and thirty-sixth, etc. rising edge of main clock MCLK. Also, the third to eleventh carry signals shown in FIGS. 9C to 9K are generated in the same manner as mentioned above, and become sequentially "HIGH" in numerical order according to the carry signals. Here, the period in which the carry signal is enabled is delayed from that of main clock MCLK. The period of every carry signal is eleven (N) times longer than that of main clock MCLK, and each carry signal is enabled during a period of main clock MCLK.

FIGS. 10A through 10P are timing diagrams which show data latched in flip-flops FO1 to FO6, FE1 to FE6, FOX1, FOX2, FEX1, and FEX2 according to each cycle. The numerals shown in the waveforms denote the order of the input data, and CX, where X is 1 to 23, shown above the input data denotes the order of the carry signals for latching the input data in the flip-flops.

FIG. 11A shows data output to a first memory (not shown) of source drive unit 15 and FIG. 11B shows data output to a second memory (not shown) of source drive unit 15.

The operation of each flip-flop to latch input data according to the carry signals will be described in detail.

The first odd-number flip-flop FO1 721 latches the first data according to C1, corresponding to first carry signal CARRY1, the thirteenth data according to C7, corresponding to seventh carry signal CARRY7, the twenty-third data according to C12, corresponding to first carry signal CARRY1, and the thirty-fifth data of IN_A according to C18, corresponding to seventh carry signal CARRY7. In the above-described manner, first odd number flip-flop FO1 721 latches (N×2k+1)th data according to first carry signal CARRY1 and (N×(2k+1)+2)th data according to seventh carry signal CARRY7, where N=11, M=5, and k=0, 1, 2, 3, . . . .

In the first even-number flip-flop FE1 722, the second data is latched according to C1, corresponding to first carry signal CARRY1, and the fourteenth data is latched according to C7, corresponding to seventh carry signal CARRY7, the twenty-fourth data is latched according to C12, corresponding to first carry signal CARRY1, and the thirty-sixth data according to C18, corresponding to seventh carry signal CARRY7. In the above-described manner, (N×2k+2)th data is latched according to first carry signal CARRY1 and (N×(2k+1)+3)th data according to seventh carry signal CARRY7.

In the second odd-number flip-flop FO2 723, the third data is latched according to C2, corresponding to second carry signal CARRY2, the fifteenth data according to C8, corresponding to eighth carry signal CARRY8, the twenty-fifth data according to C13, corresponding to second carry signal CARRY2, and the thirty-seventh data according to C19, corresponding to eighth carry signal CARRY8. In the above-described manner, (N×2k+3)th data is latched according to second carry signal CARRY2 and (N×(2k+1)+4)th data is latched according to eighth carry signal CARRY8.

In the second even-number flip-flop FE2 724, the fourth data is latched according to C2, corresponding to second carry signal CARRY2, and the sixteenth data according to C8, corresponding to eighth carry signal CARRY8, the twenty-sixth data according to C13, corresponding to second carry signal CARRY2, and the thirty-eighth data according to C19, corresponding to eighth carry signal CARRY8. In the above-described manner, (N×2k+4)th data is latched according to second carry signal CARRY2 and (N×(2k+1)+5)th data is latched according to eighth carry signal CARRY8.

In the third odd-number flip-flop FO3 725, the fifth data is latched according to C3, corresponding to third carry signal CARRY3, the seventeenth data according to C9, corresponding to ninth carry signal CARRY9, the twenty-seventh data is latched according to C14, corresponding to third carry signal CARRY3, and the thirty-ninth data according to C20, corresponding to ninth carry signal CARRY9. In the above-described manner, (N×2k+5)th data is latched according to third carry signal CARRY3 and (N×(2k+1)+6)th data according to ninth carry signal CARRY9.

In the third even-number flip-flop FE3 726, the sixth data is latched according to C3, corresponding to third carry signal CARRY3, the eighteenth data according to C9, corresponding to ninth carry signal CARRY9, the twenty-eighth data according to C14, corresponding to third carry signal CARRY3, and the fortieth data according to C20, corresponding to ninth carry signal CARRY9. In the above-described manner, (N×2k+6)th data is latched according to third carry signal CARRY3 and (N×(2k+1)+7)th data is latched according to ninth carry signal CARRY9.

In the fourth odd-number flip-flop FO4 727, the seventh data is latched according to C4, corresponding to fourth carry signal CARRY4, and the twenty-ninth data according to C15, corresponding to fourth carry signal CARRY4. In the above-described manner, (N×2k+7)th data are latched according to fourth carry signal CARRY4.

In the fourth even-number flip-flop FE4 728, the eighth data is latched according to C4, corresponding to fourth carry signal CARRY4, and the thirtieth data according to C15, corresponding to fourth carry signal CARRY4. In the above-described manner, (N×2k+8)th data is latched according to fourth carry signal CARRY4.

In the fifth odd-number flip-flop FO5 729, the ninth data is latched according to C5, corresponding to fifth carry signal CARRY5, and the thirty-first data according to C16, corresponding to fifth carry signal CARRY5. In the above-described manner, (N×2k+9)th data is latched according to fifth carry signal CARRY5.

In the fifth even-number flip-flop FE5 730, the tenth data is latched according to C5, corresponding to fifth carry signal CARRY5, and the thirty-second data according to C16, corresponding to fifth carry signal CARRY5. In the above-described manner, (N×2k+10)th data is latched according to fifth carry signal CARRY5.

In the sixth odd-number flip-flop FO6 731, the eleventh data is latched according to C6, corresponding to sixth carry signal CARRY6, and the thirty-third data according to C17, corresponding to sixth carry signal CARRY6. In the above-described manner, (N×2k+11=N×2k+N=N×(2k+1))th data is latched according to sixth carry signal CARRY6.

In the sixth even-number flip-flop FE6 732, the twelfth data is latched according to C6, corresponding to sixth carry signal CARRY6, and the thirty-fourth data according to C17, corresponding to sixth carry signal CARRY6. In the above-described manner, (N×2k+12=N×2k+N+1=N×(2k+1)+1)th data is latched according to sixth carry signal CARRY6.

In the first odd-number extra flip-flop FOX1 733, the nineteenth data is latched according to C10, corresponding to tenth carry signal CARRY10, and the forty-first data according to C21, corresponding to tenth carry signal CARRY10. In the above-described manner, (N×(2k+1)+8=N×(2k+1)+N−3=N×(2k+2)−3)th data is latched according to tenth carry signal CARRY10.

In the first even-number extra flip-flop FEX1 734, the twentieth data is latched according to C10, corresponding to tenth carry signal CARRY10, and the forty-second data according to C21, corresponding to tenth carry signal CARRY10. In the above-described manner, (N×(2k+1)+9=N×(2k+1)+N−2=N×(2k+2)−2)th data is latched according to tenth carry signal CARRY10.

In the second odd-number extra flip-flop FOX2 735, the twenty-first data is latched according to C11, corresponding to eleventh carry signal CARRY11, and the forty-third data according to C22, corresponding to eleventh carry signal CARRY11. In the above-described manner, (N×(2k+1)+10=N×(2k+1)+N−1=N×(2k+2)−1)th data is latched according to eleventh carry signal CARRY11.

In the second even-number extra flip-flop FEX2 736, the twenty-second data is latched according to C11, corresponding to eleventh carry signal CARRY11, and the forty-fourth data according to C22, corresponding to eleventh carry signal CARRY11. In the above-described manner, (N×(2k+1)+11=N×(2k+1)+N=N×(2k+2))th data are latched according to eleventh carry signal CARRY11.

The above-described procedure by which the input data is latched in each flip-flop during twenty-two periods of main clock MCLK (C1 to C22) is repeatedly performed for every group of forty-four data which is input.

Now, the procedure by which the data latched in each flip-flop is output as OUT_A and OUT_B, according to the carry signals, will be described in detail.

OUT_A sequentially outputs eleven data, e.g., the first to eleventh data and the twenty-third to thirty-third data., and OUT_B also sequentially outputs eleven data, e.g., the twelfth to twenty-second data and the thirty-fourth to forty-second data. The data are simultaneously output as OUT_A and OUT_B except during a few initial cycles of main clock MCLK.

The first to eleventh data output as OUT_A are formed from the data latched in the first to sixth odd-number flip-flops and the first to fifth even-number flip-flops. The order in which the data are output from the data latch units is based on the carry signals and is described as follows.

The first data latched in first odd-number flip-flop FO1 721 is output according to C2, corresponding to second carry signal CARRY2, and the second data latched in first even-number flip-flop FE1 722 is output according to C3, corresponding to third carry signal CARRY3.

The third data latched in second odd-number flip-flop FO2 723 is output according to C4, corresponding to fourth carry signal CARRY4, and the fourth data latched in second even-number flip-flop FE2 724 is output according to C5, corresponding to fifth carry signal CARRY5.

The fifth data latched in third odd-number flip-flop FO3 725 is output according to C6, corresponding to sixth carry signal CARRY6, and the sixth data latched in third even-number flip-flop FE3 726 is output according to C7, corresponding to seventh carry signal CARRY7.

The seventh data latched in fourth odd-number flip-flop FO4 227 is output according to C8, corresponding to eighth carry signal CARRY8, and the eighth data latched in fourth even-number flip-flop FE4 728 is output according to C9, corresponding to ninth carry signal CARRY9.

The ninth data latched in fifth odd-number flip-flop FO5 729 is output according to C10, corresponding to tenth carry signal CARRY10, and the tenth data latched in fifth even-number flip-flop FE5 730 is output according to C11, corresponding to eleventh carry signal CARRY11.

The eleventh data latched in sixth odd-number flip-flop FO6 731 is output according to C12, corresponding to first carry signal CARRY1.

The twelfth to twenty-second data output as OUT_B are formed from the data latched in the first to third odd-number flip-flops, the first to third even-number flip-flops, the first and second even-number extra flip-flops, the first and second odd-number extra flip-flops, and the sixth even-number flip-flop. The order in which the data are output according to the carry signals is described as follows.

The twelfth data latched in sixth even-number flip-flop FE6 732 is output according to C8, corresponding to eighth carry signal CARRY8.

The thirteenth data latched in first odd-number flip-flop FO1 721 is output according to C9, corresponding to ninth carry signal CARRY9, and the fourteenth data latched in first even-number flip-flop FE1 722 is output according to C10, corresponding to tenth carry signal CARRY10.

The fifteenth data latched in second odd-number flip-flop FO2 723 is output according to C11, corresponding to eleventh carry signal CARRY11, and the sixteenth data latched in second even-number flip-flop FE2 724 is output according to C12, corresponding to first carry signal CARRY1.

The seventeenth data latched in third odd-number flip-flop FO3 725 is output according to C13, corresponding to second carry signal CARRY2, and the eighteenth data latched in third even-number flip-flop FE3 726 is output according to C14, corresponding to third carry signal CARRY3.

The nineteenth data latched in first odd-number extra flip-flop FOX1 733 is output according to C15, corresponding to fourth carry signal CARRY4, and the twentieth data latched in first even-number extra flip-flop FEX1 734 is output according to C16, corresponding to fifth carry signal CARRY5.

The twenty-first data latched in second odd-number extra flip-flop FOX2 735 is output according to C17, corresponding to sixth carry signal CARRY6, and the twenty-second data latched in second even-number extra flip-flop FEX2 736 is output according to C18, corresponding to seventh carry signal CARRY7.

Data input/output operations in the interface unit according to the period of the carry signals will be described as follows.

The first and second data during C1, corresponding to first carry signal CARRY1, are latched in first odd-number flip-flop FO1 721 and first even-number flip-flop FE1 722, respectively, and the latched data are maintained until C7, corresponding to seventh carry signal CARRY7, is generated.

The third and fourth data during C2, corresponding to second carry signal CARRY2, are latched in second odd-number flip-flop FO2 723 and second even-number flip-flop FE2 724, respectively, and the latched data are maintained until C8, corresponding to eighth carry signal CARRY8, is generated. Also, the first data latched in first odd-number flip-flop FO1 721 is simultaneously output to OUT_A at C2.

The fifth and sixth data during C3, corresponding to third carry signal CARRY3, are latched in third odd-number flip-flop FO3 725 and third even-number flip-flop FE3 726, respectively, and the latched data are maintained until C9, corresponding to ninth carry signal CARRY9, is generated. Also, the second data latched in first even-number flip-flop FE1 722 is simultaneously output to OUT_A at C3.

The seventh and eighth data during C4, corresponding to fourth carry signal CARRY4, are latched in fourth odd-number flip-flop FO4 727 and fourth even-number flip-flop FE4 728, respectively, and the latched data are maintained until C15, corresponding to fourth carry signal CARRY4, is generated. Also, the third data latched in second odd-number flip-flop FO2 723 is simultaneously output to OUT_A at C4.

The ninth and tenth data during C5, corresponding to fifth carry signal CARRY5, are latched in fifth odd-number flip-flop FO5 729 and fifth even-number flip-flop FE5 730, respectively, and the latched data are maintained until C16, corresponding to fifth carry signal CARRY5, is generated. Also, the fourth data latched in second even-number flip-flop FE2 724 is simultaneously output to OUT_A at C5.

The eleventh and twelfth data during C6, corresponding to sixth carry signal CARRY6, are latched in sixth odd-number flip-flop FO6 731 and sixth even-number flip-flop FE6 732, respectively, and the latched data are maintained until C17, corresponding to sixth carry signal CARRY6, is generated. Also, the fifth data latched in third odd-number flip-flop FO3 725 is simultaneously output to OUT_A at C6.

The thirteenth and fourteenth data during C7, corresponding to seventh carry signal CARRY7, are latched in first odd-number flip-flop FO1 721 and first even-number flip-flop FE1 732, respectively, and the latched data are maintained until C12, corresponding to first carry signal CARRY1, is generated. Also, the sixth data latched in third even-number flip-flop FE3 726 is simultaneously output to OUT_A at C7.

The fifteenth and sixteenth data during C8, corresponding to eighth carry signal CARRY8, are latched in second odd-number flip-flop FO2 723 and second even-number flip-flop FE2 724, respectively, and the latched data are maintained until C13, corresponding to second carry signal CARRY2, is generated. Also, the seventh data latched in fourth odd-number flip-flop FO4 727 and the twelfth data latched in sixth even-number flip-flop FE6 732 are simultaneously output to OUT_A and OUT_B, respectively, at C8.

The seventeenth and eighteenth data during C9, corresponding to ninth carry signal CARRY9, are latched in third odd-number flip-flop FO3 725 and third even-number flip-flop FE3 726, respectively, and the latched data are maintained until C14, corresponding to third carry signal CARRY3, is generated. Also, the eighth data latched in fourth even-number flip-flop FE4 728 and the thirteenth data latched in first odd-number flip-flop FO1 721 are simultaneously output to OUT_A and OUT_B, respectively, at C9.

The nineteenth and twentieth data during C10, corresponding to tenth carry signal CARRY10, are latched in first odd-number extra flip-flop FOX1 733 and first even-number extra flip-flop FEX1 734, respectively, and the latched data are maintained until C21, corresponding to tenth carry signal CARRY10, is generated. Also, the ninth data latched in fifth odd-number flip-flop FO5 729 and the fourteenth data latched in first even-number flip-flop FE1 722 are simultaneously output to OUT_A and OUT_B, respectively, at C10.

The twenty-first and twenty-second data during C1, corresponding to eleventh carry signal CARRY11, are latched in second odd-number extra flip-flop FOX2 735 and second even-number extra flip-flop FEX2 736, respectively, and are maintained until C22, corresponding to eleventh carry signal CARRY11, is generated. Also, the tenth data latched in fifth even-number flip-flop FE5 730 and the fifteenth data latched in second odd-number flip-flop FO2 723 are simultaneously output to OUT_A and OUT_B, respectively, at C11.

The twenty-third and twenty-fourth data during C12, corresponding to first carry signal CARRY1, are latched in first odd-number flip-flop FO1 721 and first even-number flip-flop FE1 722, respectively, and maintained until C18, corresponding to seventh carry signal CARRY7, is generated. Also, the eleventh data latched in sixth odd-number flip-flop FO6 731 and the sixteenth data latched in second even-number flip-flop FE2 724 are simultaneously output to OUT_A and OUT_B, respectively, at C12.

The twenty-fifth and twenty-sixth data during C13, corresponding to second carry signal CARRY2, are latched in second odd-number flip-flop FO2 723 and second even-number flip-flop FE2 724, respectively, and maintained until C19, corresponding to eighth carry signal CARRY8, is generated. Also, the twenty-third data latched in first odd-number flip-flop FO1 721 and the seventeenth data latched in third odd-number flip-flop FO3 725 are simultaneously output to OUT_A and OUT_B, respectively, at C13.

Referring to the timing diagrams shown in FIGS. 8A through 11B, in the same manner as discussed above, the operations of subsequent cycles can easily be understood.

Accordingly, the procedure for latching data in each flip-flop is summarized as follows.

Data is latched in the first odd-number flip-flop and first even-number flip-flop according to the first and seventh carry signals, in the second odd-number flip-flop and second even-number flip-flop according to the second and eighth carry signals, and in the third odd-number flip-flop and third even-number flip-flop according to the third and ninth carry signals, respectively. However, data is latched in the fourth odd-number flip-flop and the fourth even-number flip-flop only according to the fourth carry signal, in the fifth odd-number flip-flop and fifth even-number flip-flop only according to the fifth carry signal and in the sixth odd-number flip-flop and sixth even-number flip-flop only according to the sixth carry signal. Data is latched in the first odd-number extra flip-flop and first even-number extra flip-flop only according to the tenth carry signal and in the second odd-number extra flip-flop and second even-number extra flip-flop only according to the eleventh carry signal.

The procedure for outputting the data latched in each flip-flop is summarized as follows.

The first to eleventh data output as OUT_A are sequentially output according to the second to eleventh and the first carry signals e.g., C2, C3, . . . , C11, C12. Also, the twenty-third to thirty-third data and forty-fifth to fifty-fifth data are output in the same manner as discussed above. The twelfth to twenty-second data output as OUT_B are sequentially output according to the eighth to eleventh and first to seventh carry signals, e.g., C8, . . . , C11, according to the eighth to eleventh carry signals, and C12, . . . , C18 according to the first to seventh carry signals. Also, the thirty-fourth to forty-fourth data and fifty-sixth to sixty-sixth data are output in the same manner as discussed above.

Even if the memory capacity of source drive unit 15 is increased, the input/output data operations will be performed in the same manner as discussed above. For example, when the number of output data N is 101, 101 carry signals, 51 even-number flip-flops, 51 odd-number flip-flops and 4 extra flip-flops are needed. Here, the first to forty-eighth odd-number flip-flops and first to forty-eighth even-number flip-flops operate in the same manner as the first to third odd-number flip-flops and first to third even-number flip-flops of the above described embodiment. Also, the forty-ninth to fifty-first odd-number flip-flops and forty-ninth to fifty-first even-number flip-flops operate in the same manner as the fourth to sixth odd-number flip-flops and fourth to sixth even-number flip-flops of the above described embodiment. Further, the four extra flip-flops operate in the same manner as the first and second odd-number extra flip-flops and first and second even-number extra flip-flops of the above described embodiment.

Figures 12A, 12B, 12C, 12D, 12E:
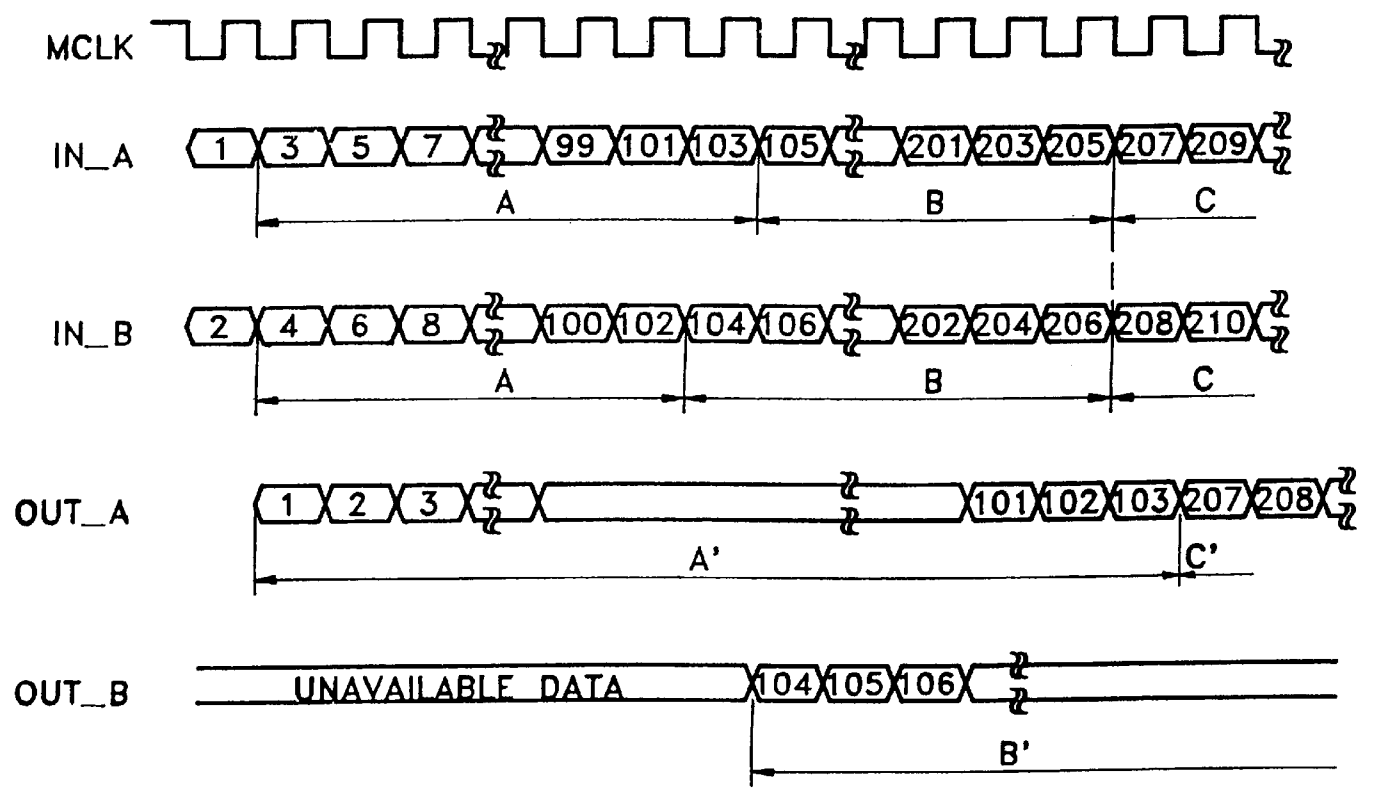

FIGS. 12A through 12E are timing diagrams showing input/output data operations of the interface unit 18 when the number of pixel data "N" stored in each memory of source drive unit 15 shown in FIG. 1 is one hundred three (103). FIG. 12A shows a waveform of main clock MCLK, and FIG. 12B shows a waveform of the odd-number input data IN_A, and FIG. 12C shows a waveform of the even-number input-data IN_B. FIG. 12D shows data output to the first memory of source drive unit 15, and FIG. 12E shows data output to the second memory of source drive unit 15.

According to the present invention, when data is latched in the interface circuit for an LCD drive unit in XGA mode, use of carry signals which have a lower frequency than that of the main clock MCLK leads to reduced electromagnetic interference (EMI). Further, the use of carry signals facilitates using fewer flip-flops than would be needed in a shift register, thereby reducing total required power consumption.

It should be understood that the invention is not limited to the illustrated embodiments and that a person of ordinary skill in the art could make many changes and modifications within the scope of this invention.

What is claimed is:

1. A graphics system for displaying pixel data on a display unit, comprising:

graphics data generating means for generating synchronizing signals and a main clock signal and dividing pixel data to be displayed on the display unit into first and second data groups, and outputting the first and second data groups;

driving means having two storing means for storing a predetermined number N of the pixel data and for driving the display unit according to said pixel data stored in said storing means; and interfacing means for sequentially arranging the pixel data of said first and second groups output from said graphics data generating means into groups of N pixel data according to a plurality of control signals each having a period, the period being a multiple of said main clock period and then outputting the groups of sequentially arranged N pixel data to said two storing means of said driving means, thereby interfacing said graphics data generating means with said driving means, wherein said interfacing means comprises:

carry signal generating means for generating N carry signals each having a period N times longer than a period of said main clock and an enable state during one period of said main clock, wherein said N carry signals are sequentially delayed according to the period of said main clock;

data latching means having N or more latches for storing said first group of pixel data and said second group of pixel data in the N or more latches according to said carry signals;

first output means for outputting from said latching means N pixel data of said second data group arranged in order according to said carry signals; and second output means for outputting from said data latching means N pixel data of said first data group arranged in order according to said carry signals.

2. A graphics system according to claim 1, wherein said first data group includes only even-number data and said second data group includes only odd-number data.

3. A graphics system according to claim 2, wherein said interfacing means comprises:

carry signal generating means for generating N carry signals each having a period N times longer than a period of said main clock and an enable state during one period of said main clock, wherein said N carry signals are sequentially delayed according to the period of said main clock;

data latching means having N or more latches for storing said even-number data and said odd-number data in the N or more latches according to said carry signals;

first output means for outputting from said latching means N odd-number output data arranged in order according to said carry signals; and second output means for outputting from said data latching means N even-number output data arranged in order according to said carry signals.

4. A graphics system according to claim 1, wherein said first data group includes only even-number data and said second data group includes only odd-number data.

5. A graphics system for displaying pixel data on a display unit, comprising:

graphics data generating means for generating synchronizing signals and a main clock signal and dividing pixel data to be displayed on the display unit into even-number data and odd-number data and outputting said even number data and odd number data;

driving means having two storing means for storing a predetermined even number of data, wherein said predetermined even number of data equals 2M, where M denotes a positive integer, and for driving the display unit according to said data stored in said storing means;

carry signal generating means for generating 2M carry signals having a period 2M times longer than a period of said main clock and an enable state during one period of said main clock, wherein said 2M carry signals are sequentially delayed according to a period of said main clock;

first odd-number latch means having (M−2) latches for receiving first to (M−2)th odd-number data from among 2M data output from said graphics data generating means and outputting the data latched therein according to said carry signals;

second odd-number latch means having two latches for receiving (M−1)th and Mth odd-number data from among said 2M data output from said graphics data generating means and outputting the data latched therein according to said carry signals;

third odd-number latch means having two latches for receiving (2M−1)th and 2Mth odd-number data from among said 2M data output from said graphics data generating means and outputting the data latched therein according to said carry signals;

first even-number latch means having (M−2) latches for receiving first to (M−2)th even-number data from among said 2M data output from said graphics data generating means and outputting the data latched therein according to said carry signals;

second even-number latch means having two latches for receiving (M−1)th and Mth even-number data from among said 2M data output from said graphics data generating means and outputting the data latched therein according to said carry signals;

third even-number latch means having two latches for receiving (2M−1)th and 2Mth even-number data from among said 2M data output from said graphics data generating means and outputting the data latched therein according to said carry signals;

first output means for outputting to a first of said two storing means of said driving means a group of 2M data output from said first and second odd-number latch means and said first and second even-number latch means; and second output means for outputting to a second of said two storing means of said driving means a group of 2M data output from said first and third odd-number latch means and said first and third even-number latch means.

6. A graphics system according to claim 5, wherein a Kth latch of said (M−2) latches of said first odd-number latch means latches Kth odd-number data from among said 2M data output from said graphics data generating means according to a Kth carry signal, and said Kth latch outputs the data latched therein to said first output means according to a 2Kth carry signal, and latches (M+K)th odd-number data from among said 2M data output from said graphics data generating means according to a (M+K)th carry signal and outputs the data latched therein to said second output means according to a (M+2K)th carry signal, where K denotes a positive integer less than or equal to M−2.

7. A graphics system according to claim 5, wherein a Kth latch of said (M−2) latches of said first even-number latch means latches a Kth even-number data from among said 2M data output from said graphics data generating means according to a Kth carry signal, and said Kth latch outputs the data latched therein to said first output means according to (2k+1)th carry signal, and latches a (M+K)th even-number data from among said 2M data output from said graphics data generating means according to a (M+K)th carry signal and outputs the data latched therein to said second output means according to (M+2K+1)th carry signal, where K is a positive integer less than or equal to M−2.

8. A graphics system according to claim 5, wherein one of the latches of said second odd-number latch means latches (M−1)th odd-number data from among said 2M data output from said graphics data generating means according to a (M−1)th carry signal and outputs the data latched therein to said first output means according to a 2(M−1)th carry signal, and the other latch of said second odd-number latch means latches Mth odd-number data from among said 2M data output from said graphics data generating means according to an Mth carry signal and outputs the data latched therein to said first output means according to a 2Mth carry signal.

9. A graphics system according to claim 5, wherein one of the latches of said second even-number latch means latches (M−1)th even-number data from among said 2M data output from said graphics data generating means according to a (M−1)th carry signal and outputs the data latched therein to said first output means according to a (2M−1)th carry signal, and the other latch of said second even-number latch means latches Mth even-number data from among said 2M data output from said graphics data generating means according to an Mth carry signal and outputs the data latched therein to said first output means according to a first carry signal.

10. A graphics system according to claim 5, wherein one of the latches of said third odd-number latch means latches (2M−1)th odd-number data from among said 2M data output from said graphics data generating means according to a (2M−1)th carry signal and outputs the data latched therein to said second output means according to a third carry signal, and the other latch of said second even-numbered latch means latches 2Mth odd-number data from among said 2M data output from said graphics data generating means according to a 2Mth carry signal and outputs the data latched therein to said second output means according to a fifth carry signal.

11. A graphics system according to claim 5, wherein one of the latches of said third even-number latch means latches (2M−1)th even-number data from among said 2M data output from said graphics data generating means according to a (2M−1)th carry signal and outputs the data latched therein to said second output means according to a fourth carry signal, and the other latch of said third even-number latch means latches 2Mth even-number data from among said 2M data output from said graphics data generating means according to a 2Mth carry signal and outputs the data latched therein to said second output means according to a sixth carry signal.

12. A graphics system for displaying pixel data on a display unit, comprising:

graphics data generating means for generating synchronizing signals and a main clock signal and dividing pixel data to be displayed on the display unit into even-number data and odd-number data and outputting said even-numbered and odd-numbered data;

drive means having two storing means for storing a predetermined odd number of data equaling (2M+1) pixel data, wherein M is a positive integer, and for driving the display unit according to said data stored in said storing means;

carry signal generating means for generating (2M+1) carry signals having a period (2M+1) times longer than a period of said main clock and an enable state during one period of said main clock, wherein said (2M+1) carry signals are sequentially delayed by a period of said main clock;

first odd-number latch means having (M−2) latches for receiving first to (M−2)th data and (M+2)th to (2M−1)th data from among (2M+1) odd-number data output from said graphics data generating means and outputting the data latched therein according to said carry signals;

second odd-number latch means having three latches for receiving (M−1)th, Mth, and (M+1)th data from among the (2M+1) odd-number output from said graphics data generating means and outputting the data latched therein according to said carry signals;

third odd-number latch means having two latches for receiving 2Mth and (2M+1)th odd-number data from among the (2M+1) data output from said graphics data generating means and outputting the data latched therein according to carry signals;

first even-number latch means having (M−2) latches for receiving first to (M−2)th data and (M+2)th to (2M−1)th even-number data from among the (2M+1) even-number data output from said graphics data generating means and outputting the data latched therein according to said carry signals;

second even-number latch means having three latches for receiving (M−1)th, Mth, and (M+1)th even-number data from among the (2M+1) data output from said graphics data generating means and outputting the data latched therein according to said carry signals;

third even-number latch means having two latches for receiving 2Mth and (2M+1)th even-number data from among the (2M+1) data output from said graphics data generating means and outputting the data latched therein according to said carry signals;

first output means for outputting to a first of said two storing means of said driving means (2M+1) data output from said first and second odd-number latch means, said first even-number latch means, and said first and second latches of said second even-number latch means according to said carry signals; and second output means for outputting to a second of said storing means of said driving means (2M+1) data output from a third latch of said second even-number latch means, said first and third odd-number latch means and said first and third even-number latch means according to said carry signals.

13. A graphics system according to claim 12, wherein a Kth latch of said (M−2) latches of said first odd-number latch means latches Kth data from among said (2M+1) data output from said graphics data generating means according to a Kth carry signal and outputs the data latched therein to said first output means according to a 2Kth carry signal, and latches (M+K+1)th data from among said (2M+1) odd-number data output from said graphics data generating means according to a (M+K+1)th carry signal and outputs the data latched therein to said second output means according to a (M+2(K+1))th carry signal, where K is a positive integer less than or equal to M−2.

14. A graphics system according to claim 12, wherein a Kth latch of said (M−2) latches of said first even-number latch means latches Kth data from among (2M+1) even-number data output from said graphics data generating means according to a Kth carry signal and outputs the data latched therein to said first output means according to a (2K+1)th carry signal, and latches (M+K+1)th data from among (2M+1) even-number data output from said graphics data generating means according to a (M+K+1)th carry signal and outputs the data latched therein to said second output means according to a (M+2(K+1)+1)th carry signal, where K is a positive integer less than or equal to M−2.

15. A graphics system according to claim 12, wherein a first latch of said second odd-number latch means latches (M−1)th odd-number data from among said (2M+1) data output from said graphics data generating means according to a (M−1)th carry signal and outputs the data latched therein to said first output means according to a (2M−2)th carry signal, a second latch latches Mth odd-number data from among (2M+1) data output from said graphics data generating means according to an Mth carry signal and outputs the data latched therein to said first output means according to a 2Mth carry signal, and a third latch latches (M+1)th odd-number data from among (2M+1) data output from said graphics data generating means according to a (M+1)th carry signal and outputs the data latched therein to said first output means according to a first carry signal, where K is a positive integer less than or equal to M−2.

16. A graphics system according to claim 12, wherein a first latch of said second even-number latch means latches (M−1)th even-number data from among (2M+1) data output from said graphics data generating means according to a (M−1)th carry signal and outputs the data latched therein to said first output means according to a (2M−1)th carry signal, a second latch latches Mth even-number data from among (2M+1) data output from said graphics data generating means according to an Mth carry signal and outputs the data latched therein to said first output means according to a (2M+1)th carry signal, and a third latch latches (M+1)th even-number data from among (2M+1) data output from said graphics data generating means according to a (M+1)th carry signal and outputs the data latched therein to said second output means according to a (2M−2)th carry signal.

17. A graphics system according to claim 12, wherein one latch of said third odd-number latch means latches 2Mth odd-number data from among (2M+1) data output from said graphics data generating means according to a 2Mth carry signal and outputs the latched data to said second output means according to a fourth carry signal, and the other latch of said third odd-number latch means latches (2M+1)th odd-number data from among (2M+1) data output from said graphics data generating means according to a (2M+1)th carry signal and outputs the data latched therein to said sixth output means according to a second carry signal.

18. A graphics system according to claim 12, wherein one latch of said third even-number latch means latches 2Mth even-number data from among (2M+1) data output from said graphics data generating means according to a 2Mth carry signal and outputs the data latched therein to said second output means according to a fifth carry signal, and the other latch of said third even-number latch means latches (2M+1)th even-number data from among (2M+1) data output from said graphics data generating means according to a (2M+1)th carry signal and outputs the data latched therein to said second output means according to a seventh carry signal.

19. A graphics system for displaying pixel data on a display unit, comprising:

a graphics data generator for generating synchronizing signals and a main clock signal and dividing pixel data to be displayed on the display unit into first and second data groups, and outputting the main clock signal and the first and second data groups;

a driving unit having two storing units and storing a predetermined number N of the pixel data therein, and driving the display unit according to said pixel data stored in said storing unit; and an interface unit connected to said graphics data generator and receiving the main clock signal and the first and second data groups, and in response thereto sequentially arranging the pixel data of said first and second groups into groups of N pixel data according to a plurality of control signals each having a period, the period being a multiple of said main clock period and then outputting the groups of sequentially arranged N pixel data to said storing unit of said driving unit, thereby interfacing said graphics data generator with said driving unit, wherein said interface unit comprises:

a carry signal generator for generating N carry signals each having a period N times longer than a period of said main clock and an enable state during one period of said main clock, wherein said N carry signals are sequentially delayed and output according to the period of said main clock;

a data latching unit having N or more latches, connected to said carry signal generator and storing said even-number data and said odd-number data in the N or more latches in response to said carry signals output from said carry signal generator;

a first output unit connected to said data latching unit and receiving the data latched therein, and connected to said carry signal generator, wherein said first output unit outputs N odd-number output data received from said data latching unit, arranged in order according to said carry signals; and a second output unit connected to said data latching unit and receiving the data latched therein, and connected to said carry signal generator, wherein said second output unit outputs N even-number output data received from said data latching unit arranged in order according to said carry signals.

20. A graphics system according to claim 19, wherein said first data group includes only even-number data and said second data group includes only odd-number data.

21. The graphics system according to claim 1, wherein the graphics system is an extended graphics array (XGA) graphics system, the pixel data is displayed in an XGA mode, and the graphics data generating means generates the synchronizing signals according to the XGA graphics mode.

22. The graphics system according to claim 5, wherein the graphics system is an extended graphics array (XGA) graphics system, the pixel data is displayed in an XGA mode, and the graphics data generating means generates the synchronizing signals according to the XGA graphics mode.

23. The graphics system according to claim 12, wherein the graphics system is an extended graphics array (XGA) graphics system, the pixel data is displayed in an XGA mode, and the graphics data generating means generates the synchronizing signals according to the XGA graphics mode.

24. The graphics system according to claim 19, wherein the graphics system is an extended graphics array (XGA) graphics system, the pixel data is displayed in an XGA mode, and the graphics data generating means generates the synchronizing signals according to the XGA graphics mode.

* * * * *